Figure 6:
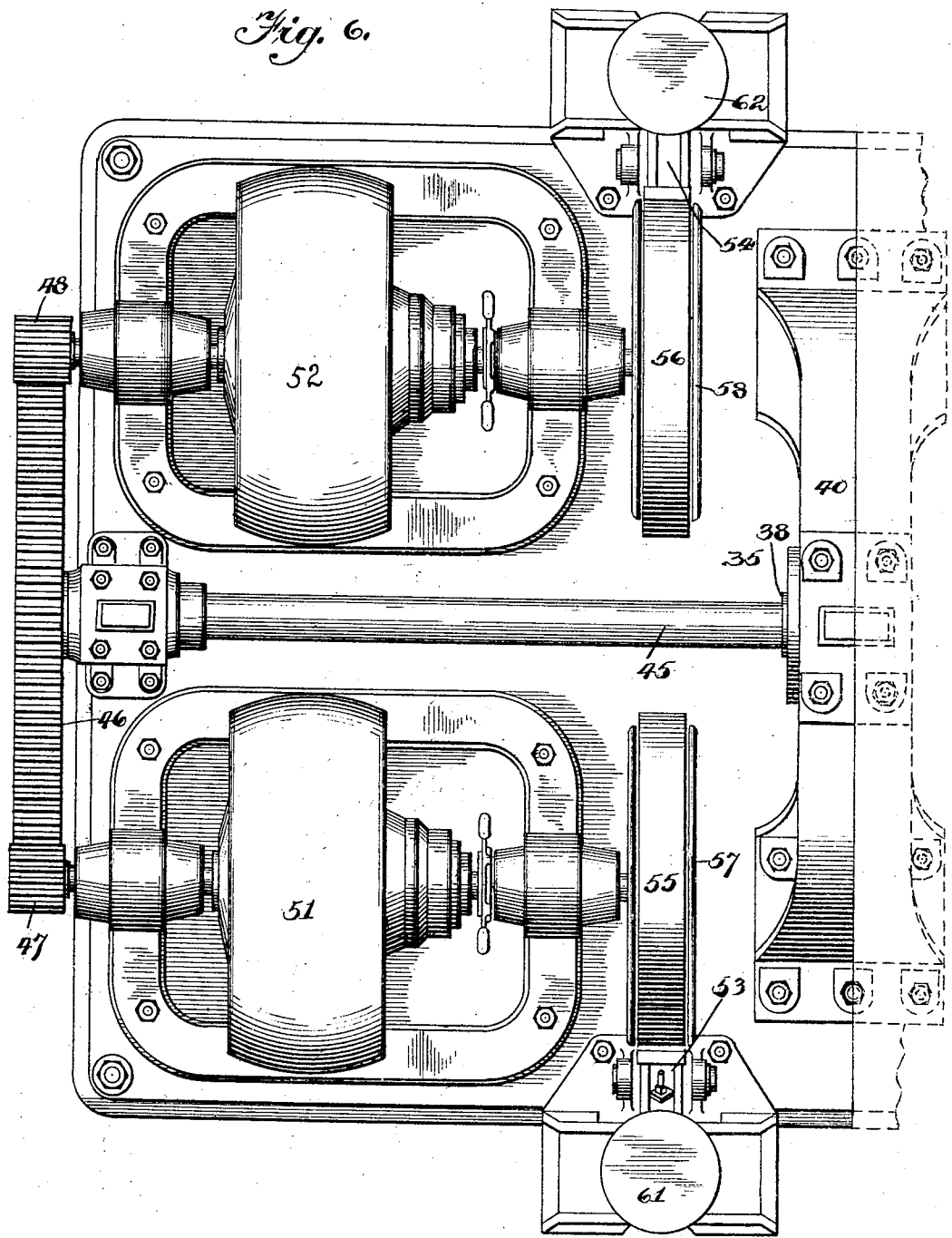

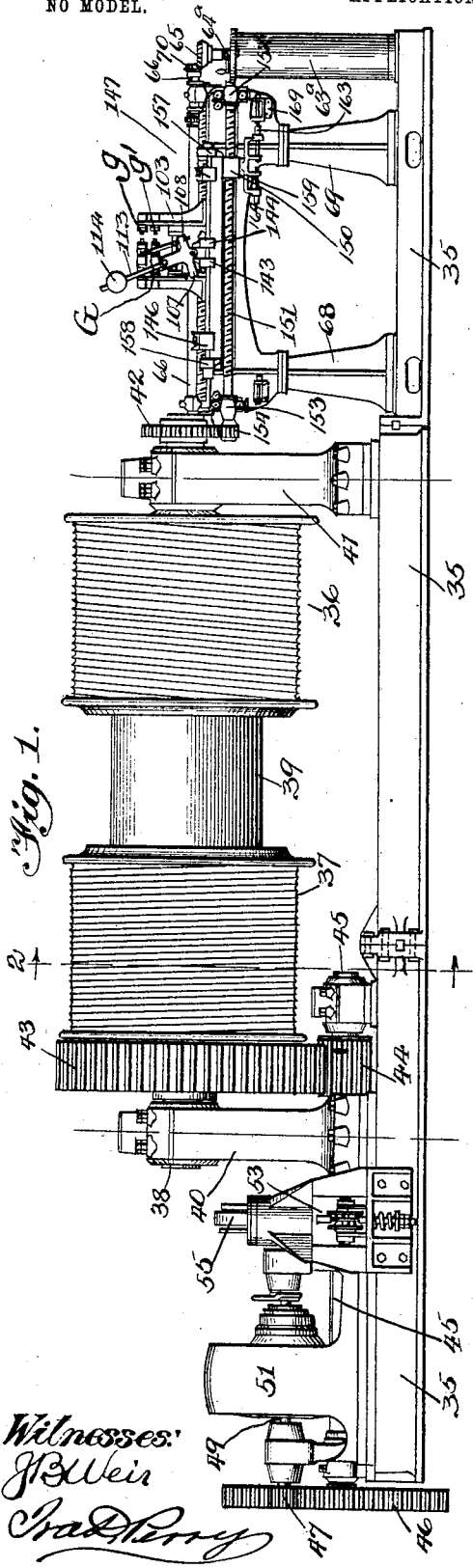

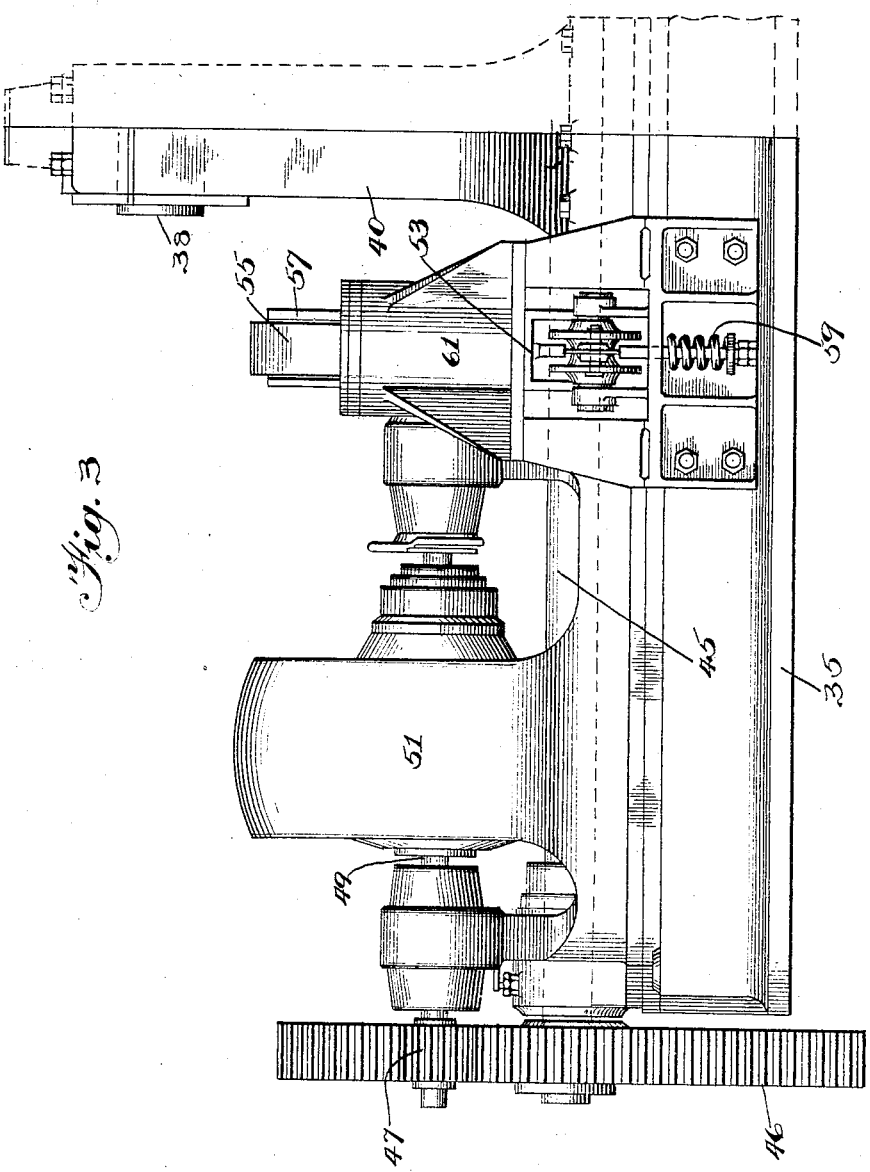

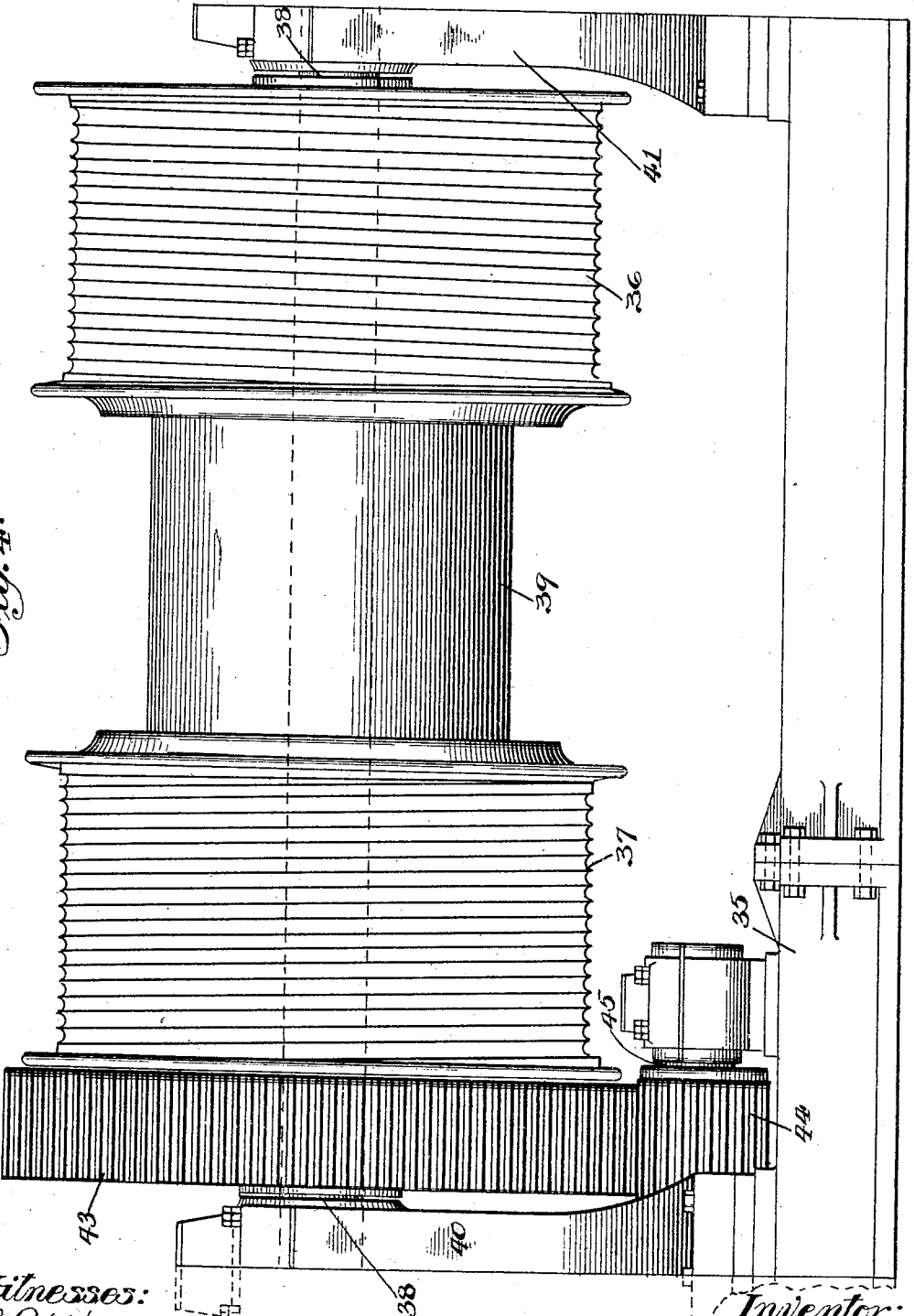

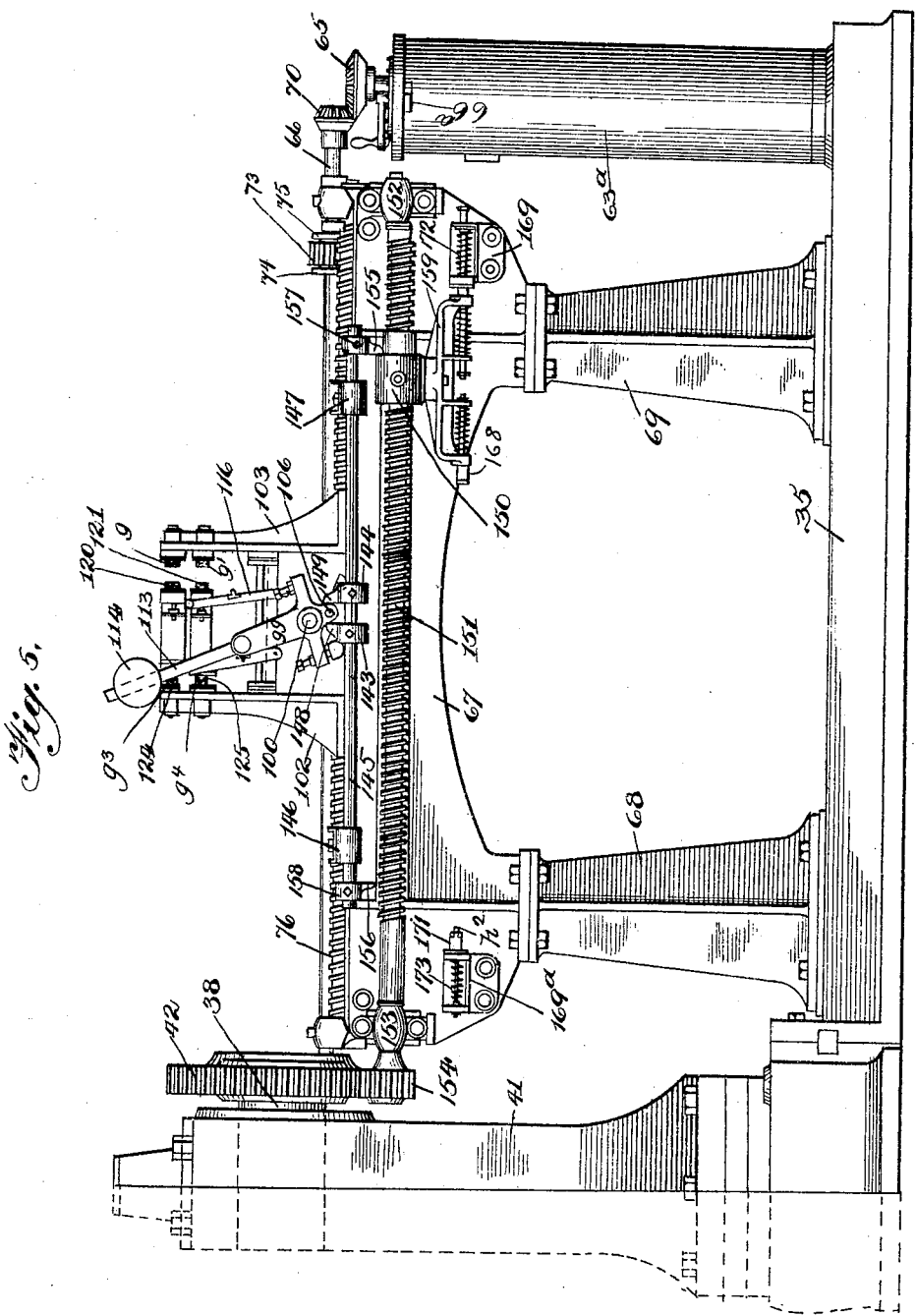

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 5.

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 6.

Witnesses:
J B Weir

Inventor:
Eugene B. Clark, 2nd
his Attys.

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 7.

Witnesses: Inventor:
Eugene B. Clark, 2nd
by Bond, Adams, Pickard & Jackson
his Attys.

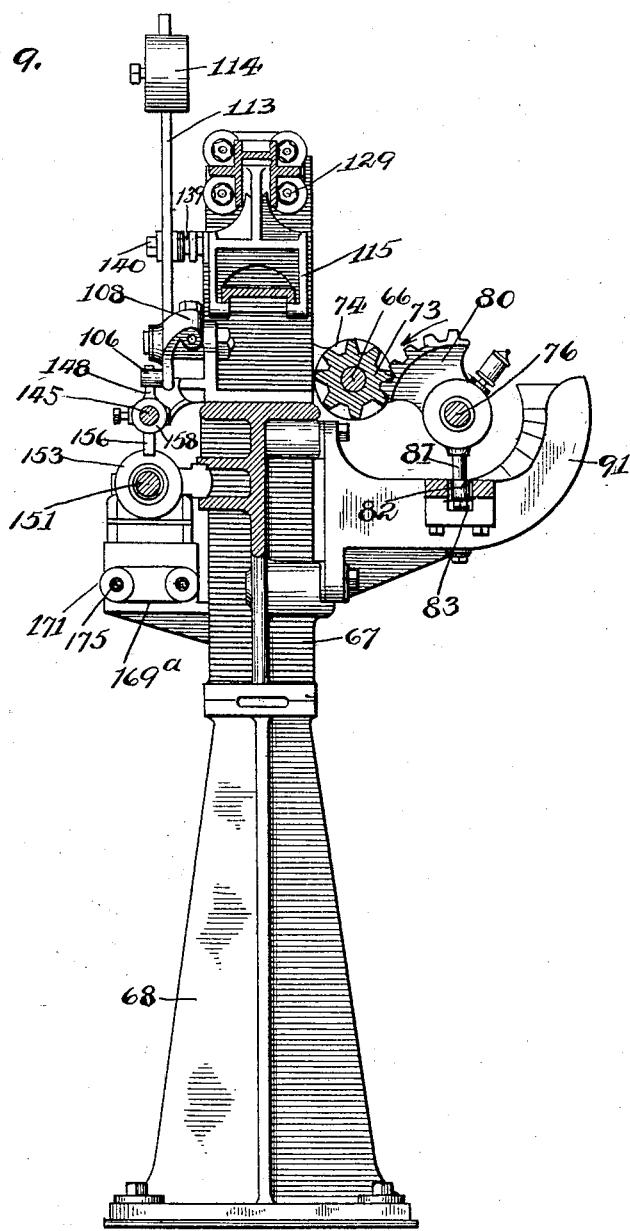

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 9.
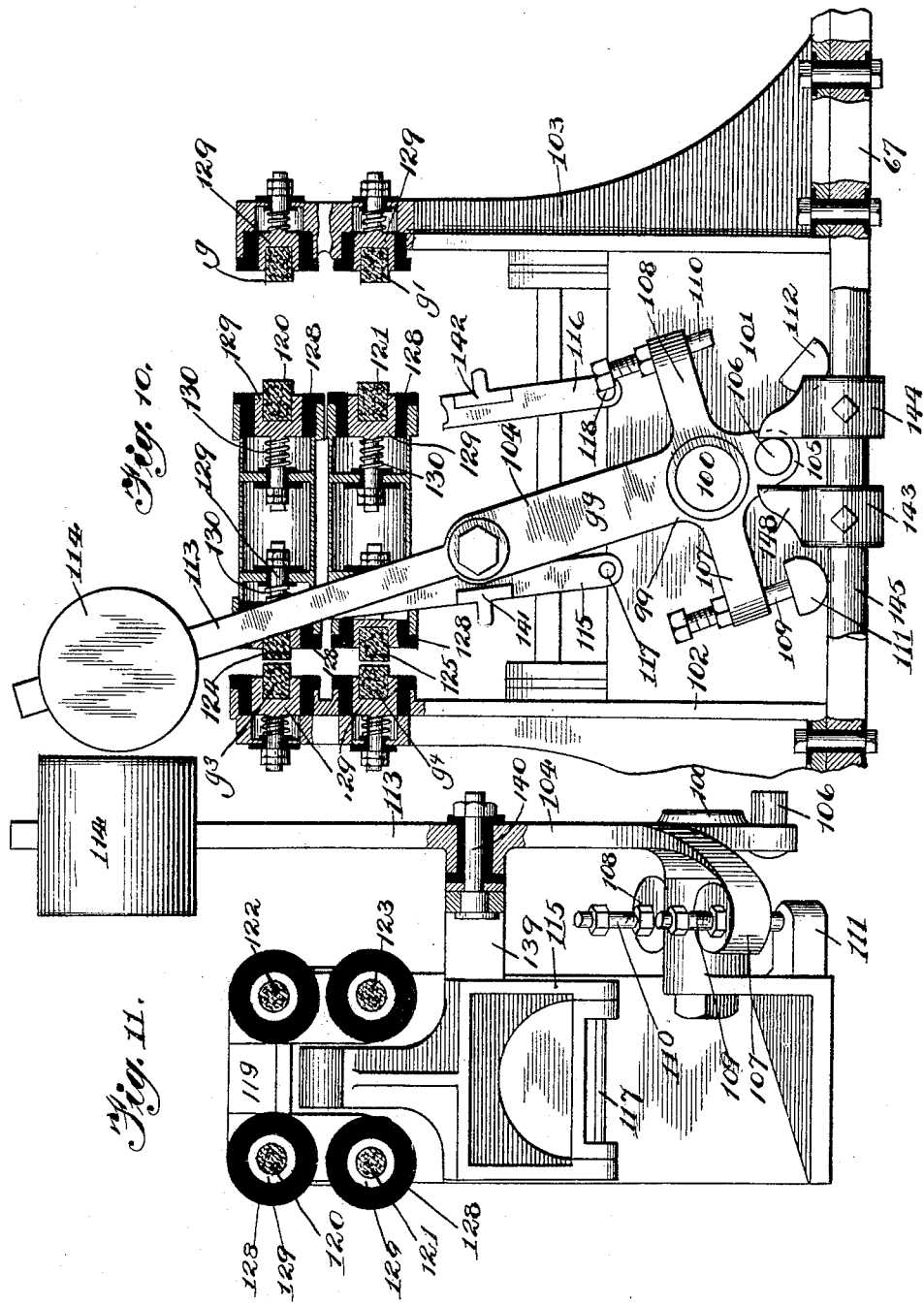
Witnesses:
J. B. Weir
Ba D. Perry
Inventor:
Eugene B. Clark, 2nd
by Dowd Adams Pickard Jackson
his Attys.

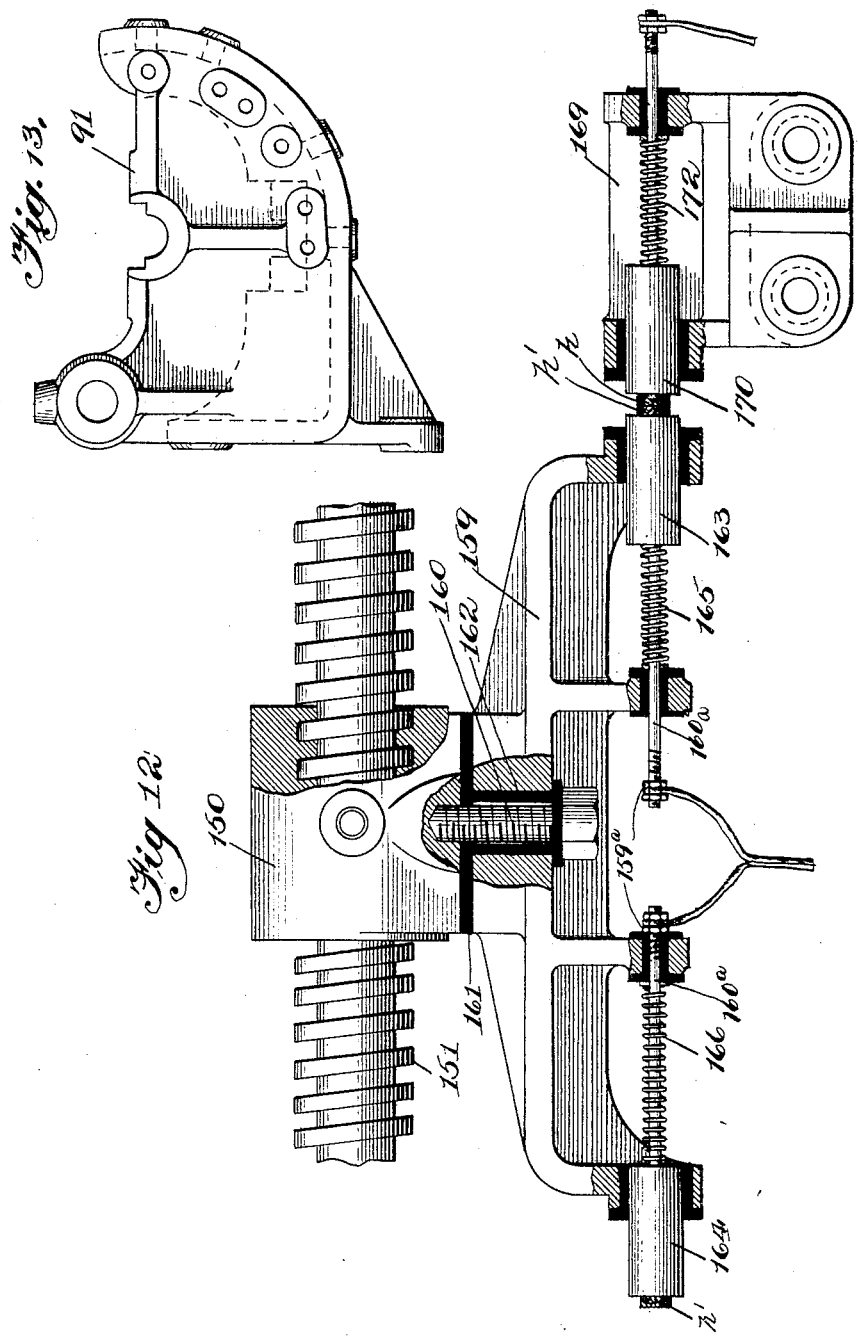

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 11.

Witnesses:
Inventor:
Eugene B. Clark, 2nd

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 12.
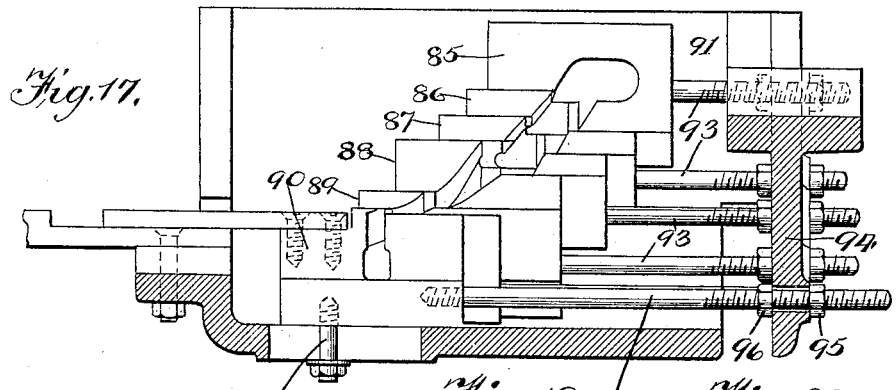
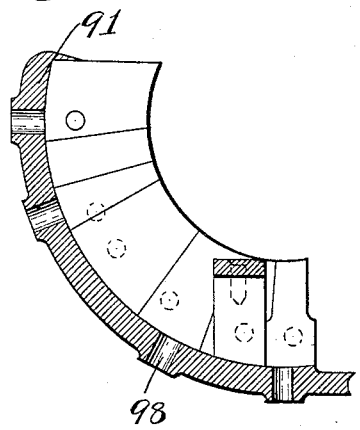
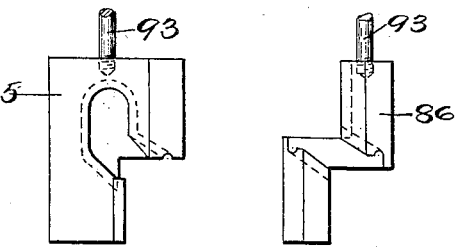 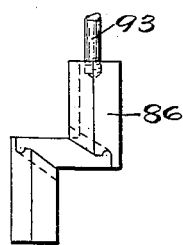
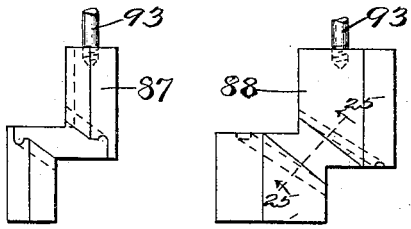 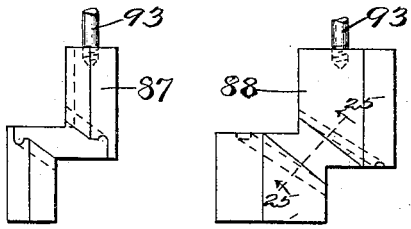
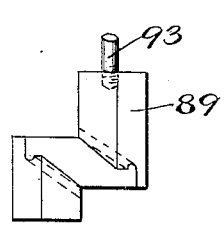 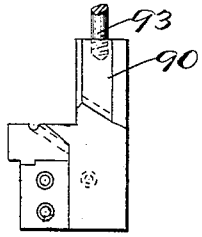 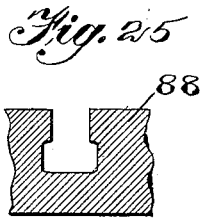
Witnesses: J.B. Weir, Ira D. Perry
Inventor: Eugene B. Clark, 2nd
by Bond, Adams, Pickard & Jackson
his Attys.

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 13.

Witnesses:
J B Weir
Ira D. Perry

Inventor:
Eugene B. Clark, 2nd
by Bond Adams Pickard and Jackson
his Attys.

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 14.

Witnesses
JBWeir
Ira D Perry

Inventor:
Eugene B. Clark, 2nd
by Bond Adams Pickard & Jackson
his Attys.

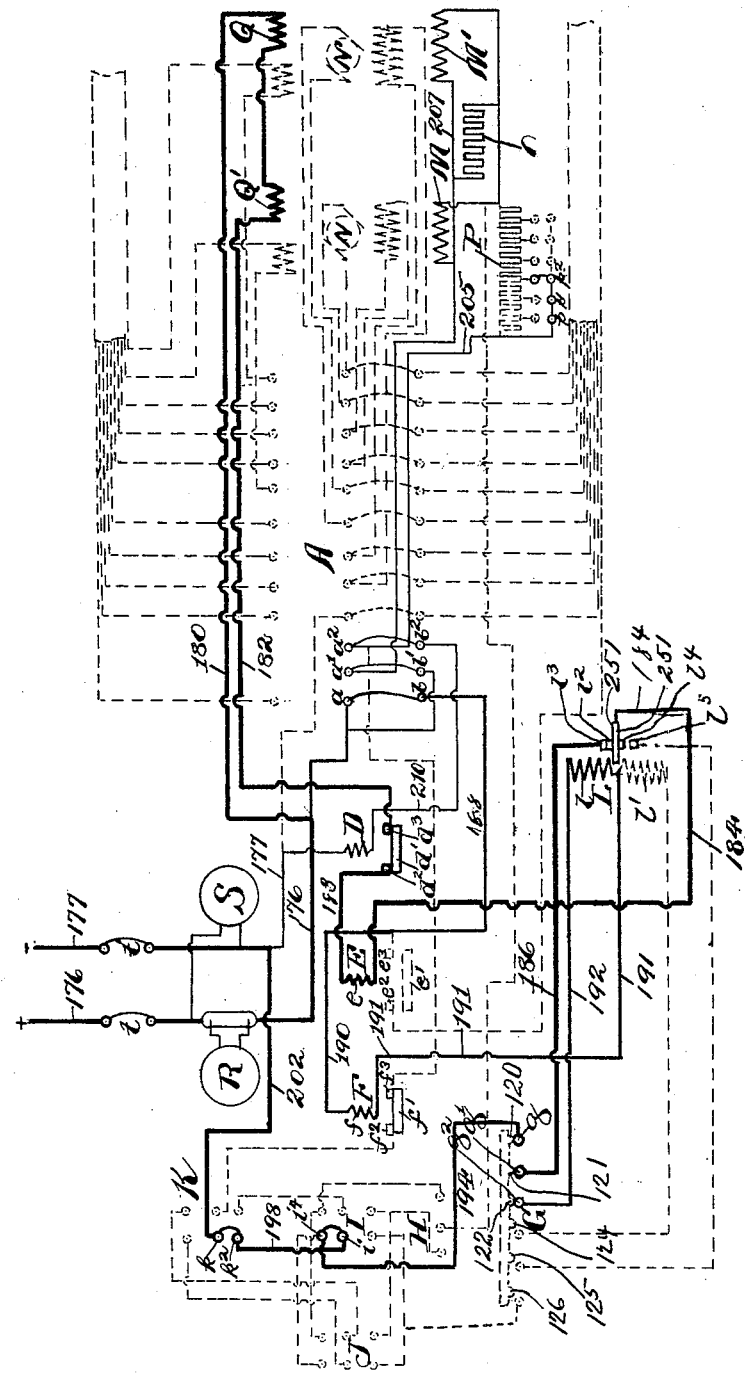

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 16.
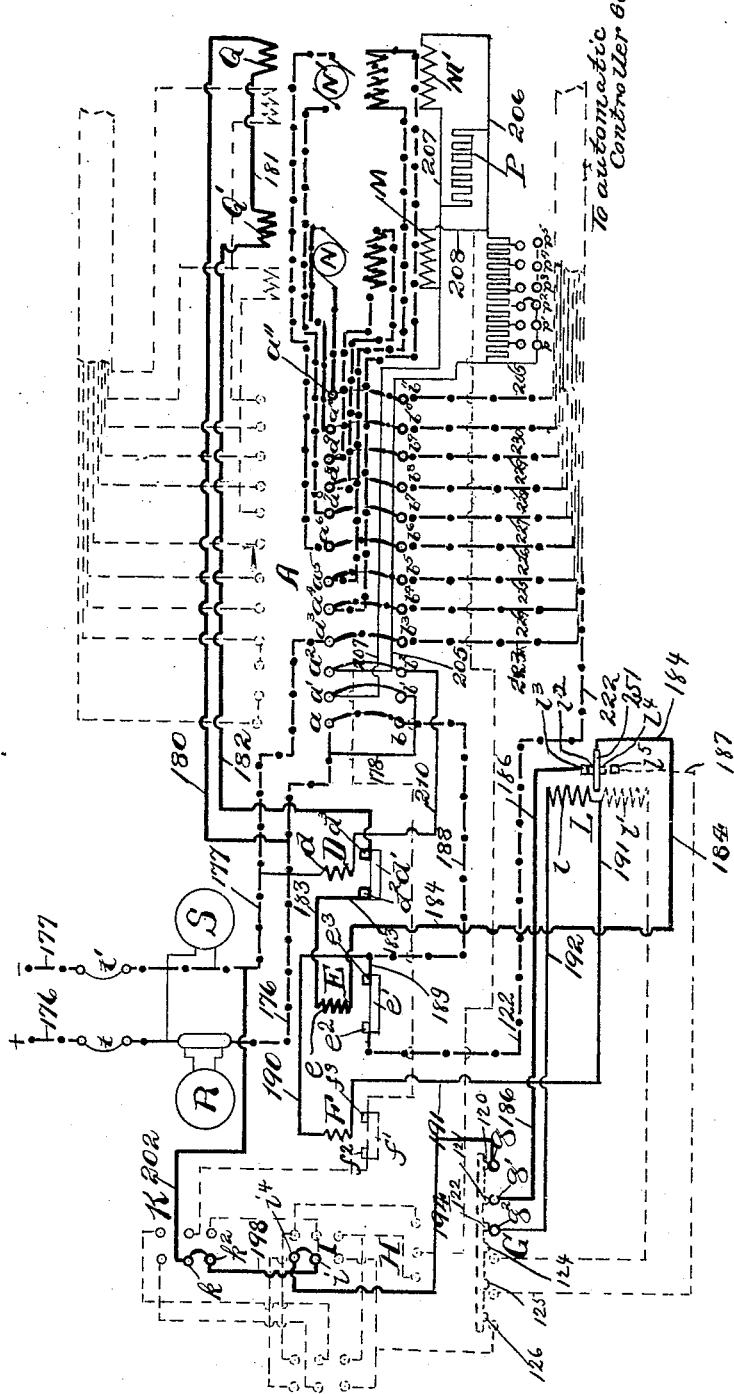
Witnesses:
JBWeir
Ira D. Perry
Inventor:
Eugene B. Clark, 2nd
by Bond Adams Pickard & Jackson
his Attys.

No. 771,351. PATENTED OCT. 4, 1904.
E. B. CLARK, 2D.
ELECTRICAL HOISTING APPARATUS.
APPLICATION FILED JAN. 23, 1902.
NO MODEL. 17 SHEETS—SHEET 17.
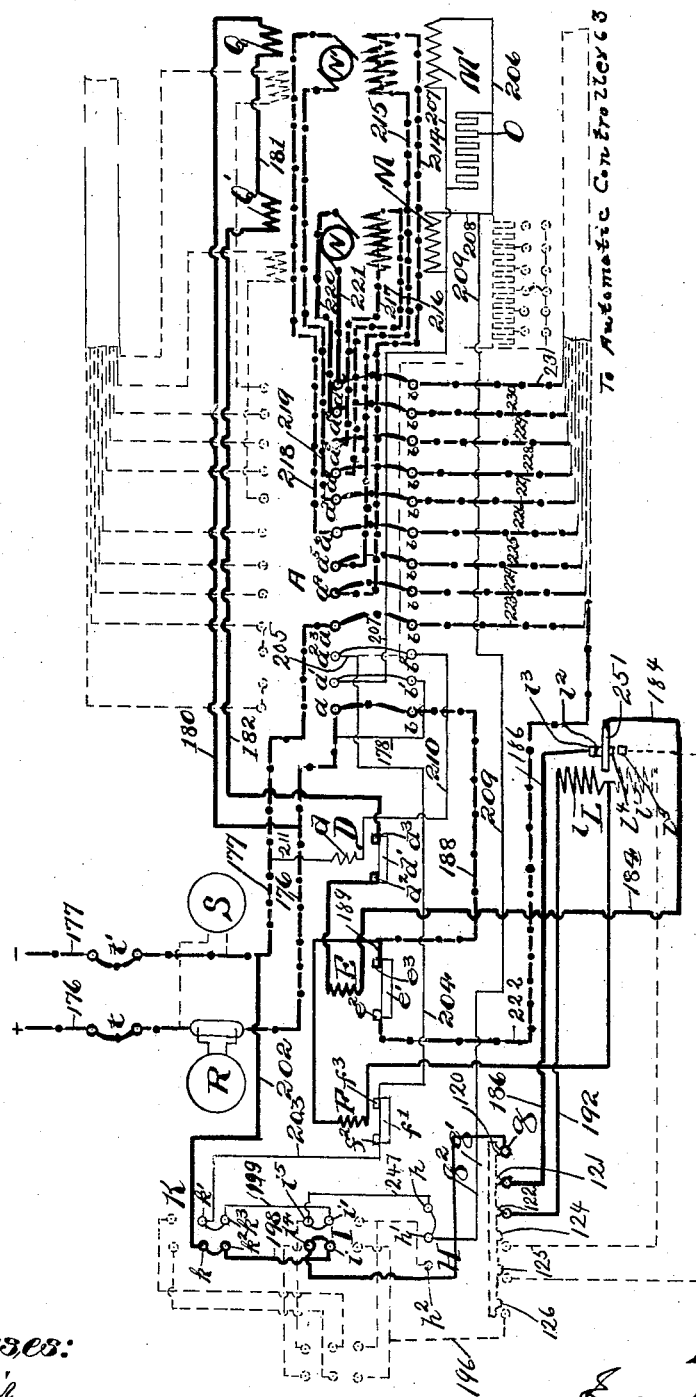

No. 771,351.

Patented October 4, 1904.

UNITED STATES PATENT OFFICE.

EUGENE B. CLARK, 2D, OF CHICAGO, ILLINOIS, ASSIGNOR TO OTIS ELEVATOR COMPANY, A CORPORATION OF NEW JERSEY.

ELECTRICAL HOISTING APPARATUS.

SPECIFICATION forming part of Letters Patent No. 771,351, dated October 4, 1904.

Application filed January 23, 1902. Serial No. 90,870. (No model.)

*To all whom it may concern:*

Be it known that I, EUGENE B. CLARK, 2d, a citizen of the United States, residing at Chicago, in the county of Cook and State of Illinois, have invented certain new and useful Improvements in Electrical Hoisting Apparatus, of which the following is a specification, reference being had to the accompanying drawings.

My invention relates to hoisting mechanism, and has special reference to hoists or elevators arranged to be operated and controlled by electric mechanism.

The special embodiment of my invention illustrated in the accompanying drawings and hereinafter described is an electric skip-hoist or hoisting apparatus designed for use in supplying ore, coke, coal or charcoal, and limestone to blast-furnaces; but my invention is not restricted to use for such purpose only, and I wish it to be understood that my improvements, in so far as they are applicable, may be employed in various forms of hoisting machinery. With this understanding I shall direct my explanation of the apparatus and its operation particularly to the mechanism illustrated in the drawings.

The class of labor employed in iron and steel mills for charging the blast-furnaces is comparatively low as regards intelligence, so that it is highly desirable, if not imperative, that the machinery employed be of such construction that it may be operated by persons of even the least intelligence and experience, and this has prevented to a large extent the employment of electric hoisting machinery where it has been necessary for it to be operated by unskilled laborers, as considerable judgment and intelligence is necessary to prevent the cars from being carried up or down beyond the proper point, errors in either of which directions are apt to result disastrously.

The object of my invention is to provide an improved hoisting mechanism operated by electricity which will be entirely automatic in its operation, the only manual operation necessary being to close the operating-switch, all other operations—such as the gradual increase of the speed of the car, its slowing down, and stoppage, and the adjustment of the mechanism for reverse movement—being automatically effected.

Another object is to provide means by which the electric mechanism may be controlled and regulated by hand if it should be necessary so to do on account of injury to the automatic mechanism.

Other objects, which relate to more specific improvements, are to provide for the positive regulation of the speed independently of the load, to provide a plurality of motors either of which is capable of operating the skip or car and either of which may be cut out in case of accident to the motor or gearing, to provide for the operation of the skips from a distant point or a number of distant points by simply closing a switch, to provide a plurality of independent brakes automatically operated either one capable of stopping and holding a full load, and to secure economy of operation by employing speed-controlling mechanism by which the maximum efficiency at all speeds is insured. I accomplish these objects as illustrated in the drawings and as hereinafter described.

That which I regard as new will be set forth in the claims.

My improved hoisting apparatus consists, generally speaking, of a pair of hoisting-drums, to which skips are connected by oppositely-arranged cables, said drums being mounted to rotate in unison and being driven by a pair of electric motors to hoist one skip loaded while another descends empty for another load. Said motors are provided with solenoid-brakes, either of which is ample to sustain the weight of the full load. The drum-shaft is geared to and operates the controlling mechanism by which the operation of the motors is controlled. Said controlling mechanism provides for operating an ordinary series-parallel controller, by which the speed of the motors is regulated; also, for reversing the motors, for slowing them down, and for stopping them. Suitable switches, both automatic and manual, also form a part of the apparatus and provide for making and breaking the circuits necessary to securing the proper operation of the apparatus, as will be fully hereinafter described.

Figure 7:
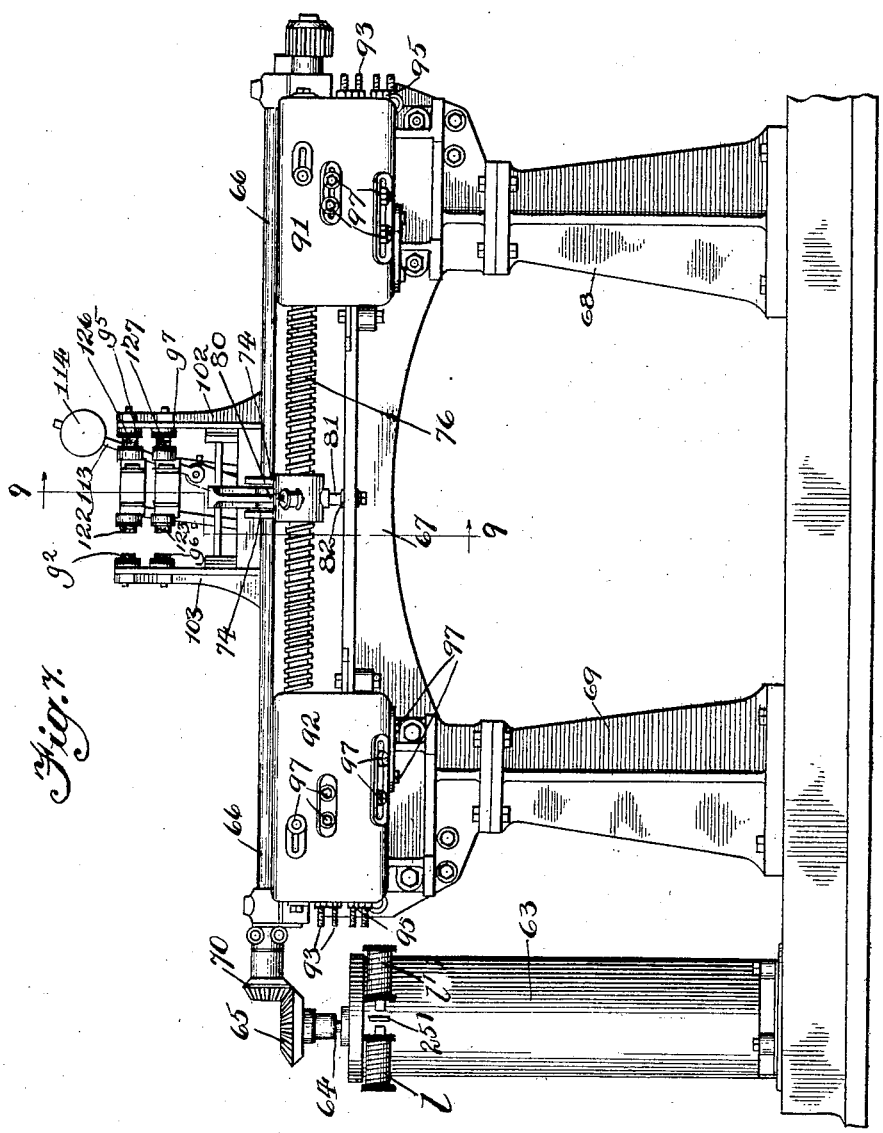
Figure 8:
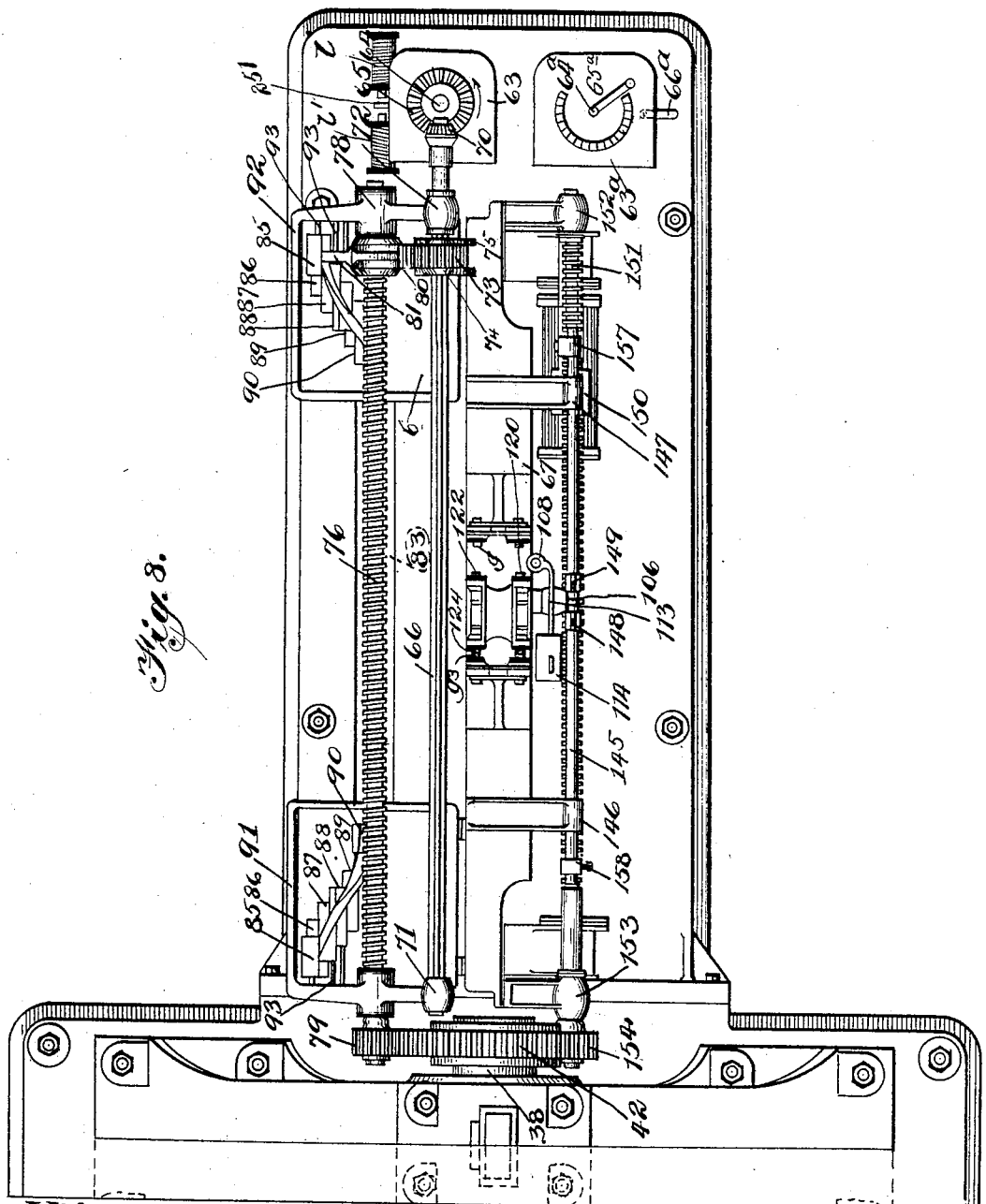
Figure 14:
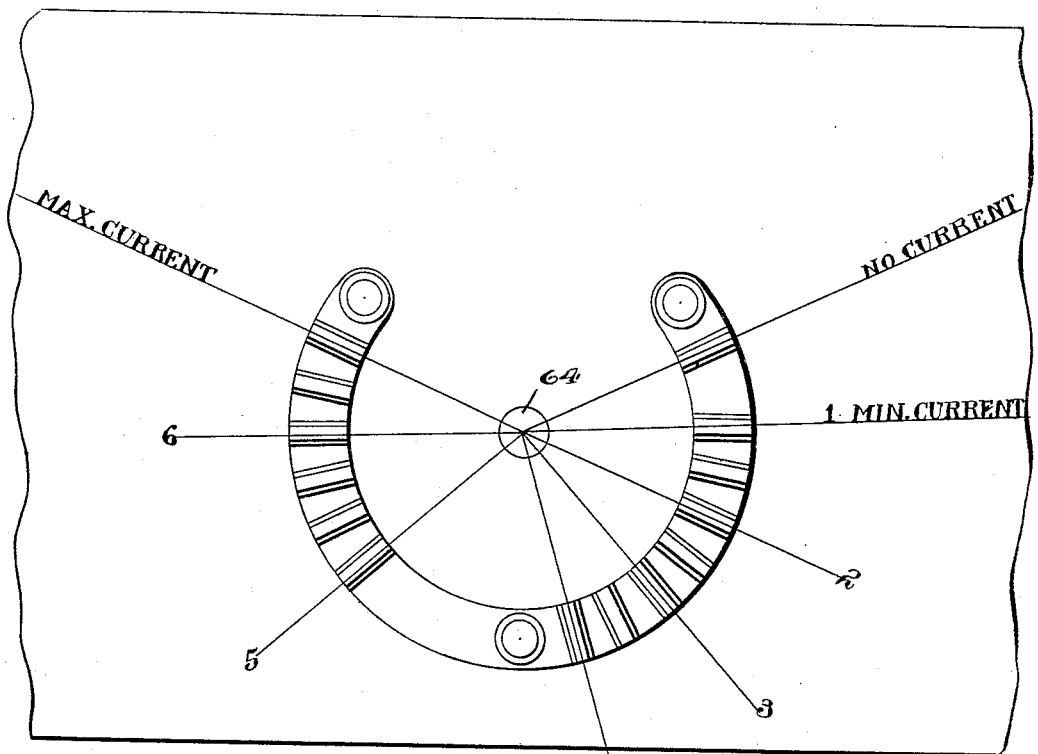
Figure 15:
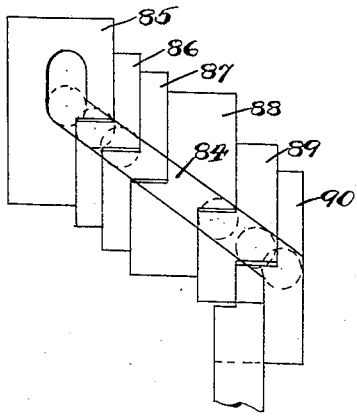
Figure 16:
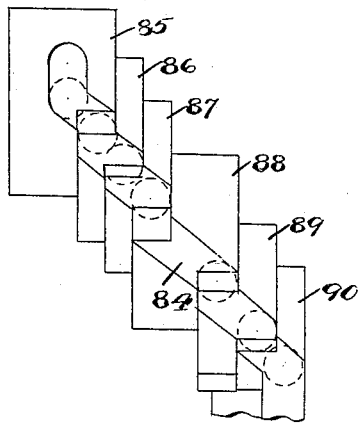
Figure 26:
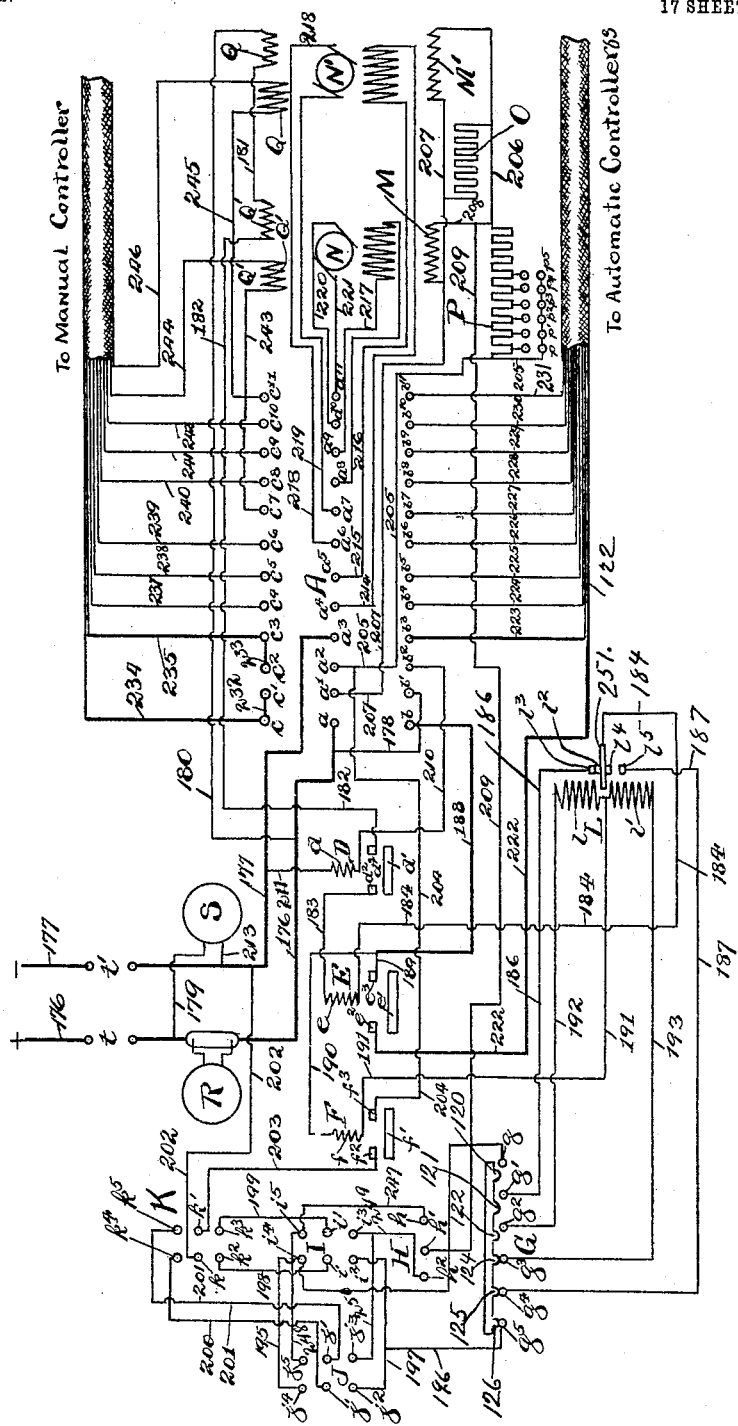
Figure 27:
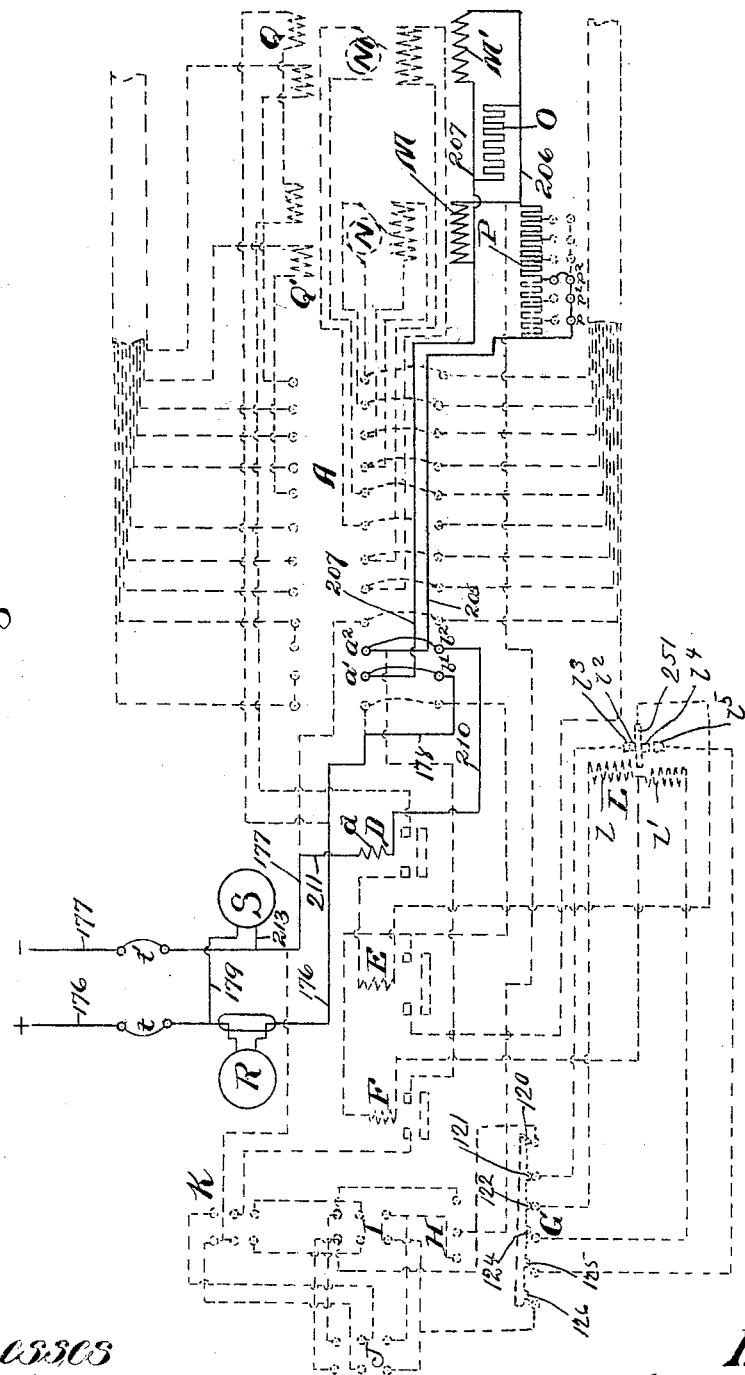

In the accompanying drawings, Figure 1 is a front elevation of the mechanical devices including the drums, motors, and controlling mechanism. Fig. 2 is a vertical section on line 2 2 of Fig. 1. Figs. 3, 4, and 5 are enlarged front elevations, respectively, of the motors, drums, and controlling mechanism. Fig. 6 is a plan view of the motors, brakes, and adjacent parts of the mechanism. Fig. 7 is a rear elevation of the controlling mechanism. Fig. 8 is a plan view thereof. Fig. 9 is a section on line 9 9 of Fig. 7. Fig. 10 is an enlarged detail, being a front elevation of the stopping mechanism, some parts being in section. Fig. 11 is an end view of the same. Fig. 12 is an enlarged detail, partly in section, being a front elevation of the slow-down switch. Fig. 13 is an end view of the housing which carries the devices for regulating the operation of the controller. Fig. 14 is a diagrammatic plan view of the automatic controller. Figs. 15 and 16 are diagrammatic views illustrating the blocks by which the operation of the controller is regulated in different positions of adjustment. Fig. 17 is a partial sectional view illustrating the interior of one of the housings in which the regulating-blocks are carried, showing said blocks in position. Fig. 18 is a sectional view of one of the housings. Figs. 19, 20, 21, 22, 23, and 24 are plan views of the different regulating-blocks. Fig. 25 is a section of one of the blocks, showing the outline of the groove through it. Fig. 26 is a diagrammatic view illustrating the system of wiring, and Figs. 27, 28, 29, and 30 are diagrammatic views illustrating the different circuits established during the operation of the machine.

Referring to the drawings, 35 indicates the bed-plate of the machine, which is preferably made in sections and is of suitable shape and construction to support the parts of the machine.

36 37 indicate the drums, which are carried on a common shaft 38 and are connected by a cylinder 39, as shown in Fig. 1. Said drums are provided with spiral grooves oppositely arranged to receive the cables of oppositely-moving skips or cars, the arrangement being such that one skip moves up loaded while the other descends empty. The shaft 38 is journaled in standards 40 41, one end projecting beyond the standard 41 and carrying a gear 42, as best shown in Figs. 1 and 5.

43 indicates a large gear carried adjacent to the drum 37 and keyed thereto, said gear being arranged to mesh with a pinion 44, mounted on a shaft 45, which is mounted in suitable bearings on the bed-plate 35, near the inner ends thereof, and extends parallel with the shaft 38. The shaft 45 carries at its outer end a gear 46, which meshes with pinions 47 48, mounted on the shafts 49 50 of motors 51 52, respectively. Said motors are arranged parallel with each other on the bed-plate 35 and are arranged to operate in unison to drive the gear 46 and shaft 45 and through said shaft and gear to operate the drums 36 37 and also the controlling mechanism.

53 54 indicate solenoid-brakes connected to the shafts of the motors 51 52, respectively. Each of said brakes is provided with two coils, one for hand and the other for automatic operation, as hereinafter set forth, and each brake must be powerful enough to sustain the weight of a full load. In the construction illustrated the brakes are of the usual strap-and-wheel type, the construction of which is so well known that detailed description thereof is not deemed necessary. It will be sufficient to say that the brake-straps 55 56 are normally held in frictional engagement with their respective wheels 57 58 by brake-springs 59 60, the brakes being released by the passage of the electric current through either of the two coils of the solenoids, which are contained in the housings 61 62, respectively. It will thus be seen that when the solenoid-coils are out of circuit the brakes are set, while when the selenoid-coils are in circuit the brakes are released.

63 indicates a controller of the type known as "series parallel," commonly employed to control two motors by varying connections from series to parallel. 64 indicates the controller-shaft, the rotation of which regulates the speed of the motors. By partly rotating said shaft to the different positions shown in Fig. 14 the current may be varied from the minimum to the maximum or may be cut off altogether. The controller is provided with suitable reversing mechanism, as hereinafter described. The construction of the controller in other respects is immaterial to my present invention, as it may be of any approved type suitable for the purpose. At its upper end the shaft 64 carries a beveled pinion 65, as shown in Fig. 5. As illustrated in Fig. 8, the controller 63 is placed on the bed-plate 35 at the end opposite that which carries the motors, and it is arranged to be operated from the shaft 38 through the instrumentality of mechanism which will now be described.

66 indicates a shaft arranged in a horizontal position on a suitable frame 67, carried on standards 68 69. The shaft 66 is supported slightly above the horizontal plane of the beveled pinion 65 and extends from near the gear 42 to the beveled pinion 65, where it is provided with a beveled pinion 70, which meshes with the pinion 65, as best shown in Figs 5 and 8. The shaft 66 is rotatably mounted in suitable bearings 71 72 provided in the frame 67, so that by rotating it the pinion 65 and controller-shaft 64 may also be rotated.

73 indicates a pinion which is mounted on the shaft 66 and is adapted to move longitudinally thereof. The pinion 73 does not, however, rotate independently of the shaft 66, since it is mounted on a feather thereon, or the shaft is made square in cross-section. Consequently rotation of the pinion 73 rotates the shaft 66. The pinion 73 is provided at opposite sides with disks 74 75 of slightly greater diameter than the pinion, so that said disks project beyond the edges of the pinion for the purpose to be hereinafter stated.

76 indicates a screw-threaded shaft or spindle, which is mounted in suitable bearings 77 78 and extends parallel with the shaft 66 and adjacent thereto, as shown in Fig. 8. One end of the shaft 76 projects inward through the bearing 77 and carries a pinion 79, which meshes with the gear 42, as shown in Fig. 8. The rotation of the gear 42 therefore rotates the shaft 76.

80 indicates a traveling nut in the form of a segmental rack which is mounted on the shaft 76 and is moved longitudinally upon the screw-threads of said shaft when it is rotated. The nut or segment 80 carries a depending arm 81, upon the lower end of which is mounted an antifriction-roller 82, which moves in a groove 83, extending longitudinally of the frame 67, as best shown in Figs. 8 and 9. The groove 83 extends from near one end of the shaft 76 to near the other end thereof and serves to prevent the segment 80 from rotating upon the shaft 76. As shown in Fig. 9, the teeth of the rack 80 mesh with the teeth of the pinion 73, extending between the disks 74 75. The result is that as the segment 80 moves longitudinally of the shaft 76 it carries with it the pinion 73, said pinion being thereby moved longitudinally of its shaft 76, and as said segment and pinion are constantly in mesh the pinion 73 cannot rotate independently of the segment 80. Consequently the rotation of the shaft 66, by which the controller-shaft 64 is rotated, is dependent entirely upon the rocking of the segment 80. For the purpose of rocking said segment guide-grooves 84 are provided near the ends of the shaft 76, said grooves being formed by a series of guide-blocks 85 86 87 88 89 90, as best shown in Figs. 15 and 16. It will be understood that a greater or less number of blocks may be employed, depending on the number of steps it is desired to have in the guide-groove. The guide-blocks forming the guide-grooves are mounted in housings 91 92, arranged at the opposite ends of the shaft 76, as shown in Fig. 8, said housings being of suitable shape to hold the guide-blocks in proper position. Owing to the fact that the arm 81 swings about the shaft 76 as an axis when the segment 80 is rocked, it is necessary that the inner surfaces of the guide-blocks be substantially equidistant from the shaft 76, making the inner surfaces of the blocks substantially concentric with the shaft 76, and the housings 91 92 are consequently segmental in form, as shown in Fig. 18. To hold the different guide-blocks in position and provide for their adjustment to regulate the outlines of the grooves 82, and thereby adjust the operation of the nut or segment 80, each block is provided with a stem 93, each of said stems extending through a plate 94 at one side of the housing and carrying nuts 95 96, by which it may adjusted and locked in place. In addition to the stems 93 set-screws 97 are provided, which pass through the curved surface of the housing and screw into the blocks at an angle to the stems 93, as best shown in Figs. 7 and 17. Holes 98 are provided in the housing for that purpose. By this construction the position of the guide-blocks may be regulated within rather wide limits. For example, as illustrated in Fig. 15, the blocks may be moved to form practically a continuous groove, or, as illustrated in Fig. 16, a series of steps may be provided in said groove, and such steps may be uniform or irregular, depending on the nature of the adjustment which it is desired to effect in the controller. The groove in the lowermost guide-block 90 registers with the adjacent end of the groove 83, so that the antifriction-roller 82 of the segment 80 passes from the groove 83 into the lower end of the groove 84, and as the nut or segment 80 is screwed along on the shaft 76 its arm 81 is deflected by the groove 84, which moves it outward, as illustrated in Fig. 8, consequently rocking the segment 80 in the direction indicated by the arrow in Fig. 9, thereby rotating the shaft 66 in the opposite direction and moving the controller-shaft 64 in the direction indicated by the arrow in Fig. 8. The controller is so arranged that such movement of the shaft 64 reduces the speed, the two motors being in series, with all the resistance in circuit by the time the arm 81 reaches the uppermost guide-block 85. The hoist is therefore slowed down gradually and finally stopped, as more fully hereinafter described. This operation takes place when the segment 80 approaches either end of the shaft 76. When the arm 81 moves down in either groove 84, the speed is increased until said arm reaches the groove 83, when the speed is at the maximum, continuing so until the housing at the opposite end of the shaft 76 is reached, when the speed is again reduced and the hoist finally stopped, as above described.

The stopping-switch (indicated on the diagrammatic views by the letter G) by which the connections are automatically established that make it possible to start the motors in an opposite direction is also carried by the frame 67 and is best shown in Figs. 5, 8, 9, 10, and 11. Its construction is as follows:

99 indicates a rocking lever which is mounted on a horizontal pivot 100, secured in a plate 101, carried between standards 102 103, which, as shown in Figs. 5 and 10, are carried by the frame 67. The lever 99, as shown in Fig. 10, is in the shape of a cross, its long arm 104 extending upward and its short arm 105 downward. Said short arm carries a laterally-projecting pin 106. (Best shown in Figs. 9 and 11.)

107 108 indicate the laterally-projecting arms of the lever 99, which arms carry adjusting-pins 109 110, which are adapted to strike stops 111 112, carried by the plate 101, as shown in Fig. 10, to limit the extent to which the lever 99 may rock. Said pins 109 110 are adjustable in their bearings in the arms 107 108, being screw-threaded for that purpose. The long arm 104 of the lever 99 carries an extension-bar 113, which carries at its upper end a weight 114, the function of which is to throw the lever 99 quickly in one direction or the other and to hold the contact devices operated thereby in contact, as will be hereinafter explained.

115 116 indicate parallel links, which are pivoted at their lower ends upon the plate 101 by means of pivots 117 118, said links extending upward and carrying at their upper ends a contact-head 119. (Best shown in Fig. 10.) The head 119 carries eight contacts 120, 121, 122, 123, 124, 125, 126, and 127, four being placed at each end. Said contacts are preferably of carbon and are mounted in bushings 128, of fiber or other insulating material, as shown in Fig. 10. In order that said contacts may yield under pressure, they are carried in plungers 129, which are mounted in the head 119 and are normally pressed outward by springs 130. (Best shown in Fig. 10.) The contact-points 120, 121, 122, and 123 are adapted to engage, respectively, with contacts $g$ $g'$ $g^2$ $g^6$, carried by the standard 103 and similarly mounted in plungers 129. (See Fig. 10.) Similarly the contacts 124 125 126 127 are adapted to engage contacts $g^3$ $g^4$ $g^5$ $g^7$, respectively, carried by the standard 102 and similarly mounted in plungers 129. The head 119 is moved from one side to the other to effect the engagement of the contacts by the rocking of the lever 99. For example, when the lever 99 is in the position shown in Fig. 10, the contacts at the left are in engagement, while when the lever is rocked in the opposite direction the contacts at the other side of the frame are in engagement. The head 119 is moved by the rocking of the lever by means of an arm 139, which is carried by the arm 104, being secured thereto by a bolt 140, said arm extending between the links 115 116 and being adapted to engage cross-bars 141 142, carried by said links, respectively, as shown in Fig. 10. From the foregoing it will be understood that the lever 99 may swing to the right from the position shown in Fig. 10 without affecting the position of the head 119 until the arm 104 swings over far enough to cause the arm 139 to strike the cross-bar 142, carried by the link 116. This does not take place until the weight 114 has passed the center of gravity and has acquired considerable momentum, so that when the arm 139 strikes the cross-bar 142 the head 119 is carried suddenly and with considerable force to the right, moving the contacts at the left-hand end thereof into engagement with the contacts carried by the standard 103. The lever 99 is rocked to carry the weight 114 through the vertical plane of the pivot 100 by means of collars 143 144, carried by a rod 145, mounted in suitable brackets 146 147, carried by the frame 67. The rod 145 is movable longitudinally. The collars 143 144 are placed a short distance apart near the center of the rod 145 and carry upwardly-projecting lugs 148 149, which lie at opposite sides of the pin 106 and at a sufficient distance apart to permit the movement of the lever 99, as above described. The arrangement is such that when the rod 145 is moved longitudinally one or the other of the lugs 148 149 will engage the pin 106 and rock the lever 99 about its pivot 100 sufficiently to carry the weight 114 to one side or the other of the vertical plane of the pivot 100. The rod 145 is moved longitudinally to effect the operation above described by means of a traveling nut 150, which is mounted upon a screw-threaded shaft or spindle 151, arranged parallel with the shaft 76 and at the opposite side of the machine therefrom, as shown in Fig. 8. The shaft 151 is similarly mounted in bearings 152 153 at the ends of the machine-frame 67 and is driven from the gear 42 by means of a pinion 154, mounted on one end of said shaft, as best shown in Fig. 5. By the rotation of the shaft 151, therefore, the nut 150 is caused to travel from near one end thereof to near the other end thereof. The pitch of the screw-threads on the shafts 76 and 151 is different, that of the threads on the shaft 151 being less, so that the nut 150 does not travel as far in a given time as the segment 80. This is due to the fact that in the machine as illustrated the segment 80 moves from one end of the shaft 76 to the other, while the nut 150 does not approach so near to the ends of its shaft 151. It will be understood also that the screw-threads of the shafts 76 and 151 are preferably alike, so that the segment 80 and nut 150 move in the same direction at the same time, but, if desired, by changing the connections they may be arranged to operate properly by moving in opposite directions.

The nut 150 is adapted to engage lugs 155 156, carried by collars 157 158, respectively, secured upon the ends of the rod 145, as shown in Fig. 5, said lugs 155 156 depending far enough so that they are engaged by the nut 150 when said nut arrives near one end or the other of the rod 145. The shaft 151 lies under and adjacent to the rod 145, so that the lugs 155 156 need not be very long. By placing the collars 157 158 near the ends of the rod 145 and also near the ends of the screw-threads of the shaft 151 the nut 150 does not engage the lugs 155 156 until it almost reaches the limit of its movement. The lugs 155 156 are so placed that the nut 150 engages said lugs and shifts the rod 145 longitudinally far enough to rock the lever 99 when it reaches the limit of its movement, so that the stopping-switch is not operated until the motors are to be stopped. The slow-down switch mechanism, which, in the diagrammatic views is indicated by the letter H, is also operated by the nut 150 and shaft 151. It consists of a head 159, secured to the nut 150, as shown in Figs. 5 and 12. In the construction shown the head 159 is secured to said nut by a bolt 160 and is insulated therefrom by an insulating-disk 161 and bushing 162. The head 159 carries at opposite ends plungers 163 164, adjustably mounted therein and normally pressed outward by springs 165 166. Said plungers carry in their outer ends carbon or other contacts $h'$, as shown in Fig. 12. 169 169$^a$ indicate brackets secured to the frame of the machine near the ends of the shaft 151, which brackets carry plungers 170 171, which are normally caused to project toward the plungers 163 164 by springs 172 173. The plungers 170 171 carry carbon contacts $h$ $h^2$, adapted to engage, respectively, the contacts $h'$ at the opposite ends of the switch. The plungers 163 164 and 170 171 are so placed and adjusted that when, for example, the nut 150 approaches the right-hand end of the shaft 151 the contacts $h'$ $h$ engage each other shortly before the limit of movement of the nut 150 is reached. This may be varied as desired by adjusting the normal position of the plungers in the head 159 by means of nuts 159$^a$, carried on the stems 160$^a$ of said plungers. As the nut continues to move in the same direction both plungers 163 and 170 are pressed back in their bearings, the springs 165 and 172 being compressed. This continues until the nut 150 has been carried to the limit of its movement and back again a greater or less distance. The same operation takes place when the nut 150 reaches the opposite end of the shaft 151. As hereinafter explained, this slow-down switch mechanism operates to short-circuit the shunt field resistance, establishing a high field-current through the shunt-fields, consequently causing the motors to run slowly regardless of the load, which may even be negative. This operation is independent also of the operation of controller 63 by segment 80, which also slows down the motors when the skips approach the end of a trip.

The operation of the mechanism thus far described is as follows: Assuming the motors to be operating, the gear 46 and shaft 45, which carries it, are driven through the pinions 47 48, mounted on the motor-shafts. The rotation of the shaft 45 drives the drums 36 37 through pinion 44 and gear 43. The drum-shaft 38 is thereby caused to rotate, rotating gear 42, which in turn drives pinions 79 and 154, said pinions rotating in the same direction. The screw-shafts 76 and 151 are thereby caused to rotate. When the drums are started in either direction, the nut or segment 80 will be at one end of the shaft 76, its arm 81 being in the upper end of the groove 84. The pinion 73, which is always in mesh with the segment 80 and moves with it, as above described, will be at the corresponding end of the shaft 66, and the automatic controller 63 will be in the minimum-current position—that is to say, it will stand at the first notch (see Fig. 14)—at which time the motors will be in series with all resistance in, thereby connecting the motors for the slowest speed. At the same time the nut 150 will be near the corresponding end of its shaft 151 and the stopping-switch will be in position to cause the contacts carried by the head 119 to engage the contacts at the side farthest from the nut 80. For example, when the nut 80 is in the position shown in Figs. 5 and 8 the stopping-switch will be swung into position to close the circuit to the left. When contact is thus made to the left, as shown, which operation took place at the moment when the nut 80 reached the extreme right-hand end of the shaft 76 and the speed was reduced to the minimum, the proper connections are made by the stopping-switch to cause the motors to operate in the opposite direction when started up for the next trip. This results in reversing the direction of rotation of the shafts 76, 66, and 151, so that the nut 80, pinion 73, and nut 150 all move in the opposite direction, said nut moving at a slower rate of speed than the segment or nut 80 and pinion. As the nut 80 moves to the left its arm 81 is carried down in the groove 84, slowly rotating the shaft 66 and gradually increasing the speed until as the arm 81 passes out of the groove 84 the maximum speed is attained. While this is taking place the nut 150 is moving toward the opposite end of the shaft 151; but it performs no function until it approaches the opposite end of said shaft. The segment or nut 80 and pinion 73 reach the lower end of the groove 84 at the opposite end of the shaft 76 a short time before the nut 150 has moved far enough to cause the contact-point $h'$ to engage the contact-point $h^2$ and before the nut 150 reaches the lug 156, carried by the rod 145. The adjustment of the parts is such that the contacts $h'$ and $h^2$ do not engage until the controller 63 is nearly turned off by the moving of the arm 81 of the nut 80 up in the groove 84, thereby slowing down the motors. The engagement of contact-points $h'$ and $h^2$ will also cause the motors to slow down, for reasons hereinafter explained. Just before the segment 80 reaches the limit of its movement the nut 150 comes into engagement with the lug 156, slowly moving the rod 145 to the left. Said rod, through lug 149, thereby rocks the lever 99, raising the weight carried thereby until it crosses the vertical plane of the pivot of said rod, when it falls suddenly on the other side, causing the stopping-switch to be closed sharply and surely, and thereby stopping the motors and making the proper connections, so that when the motors are again started for the return trip they operate in the opposite direction, causing the moving parts to move back again. The controller 63 is reversed by means of a reversing-switch L, consisting of a reversing-lever 251, operated by solenoids $l$ $l'$, arranged at opposite sides thereof, as shown in Fig. 8. The reversing-lever is of the usual construction and is swung to one side or the other to reverse the controller by energizing one or the other of the solenoids. This is accomplished through the contacts carried by the stopping-switch, the arrangement being such that when said switch is moved in either direction, as above described, connections are made by which the appropriate reversing-switch solenoid is energized.

The controller 63 is intended for use only in connection with the automatic controlling mechanism. As it is desirable to provide means by which the hoisting mechanism may be operated by hand instead of automatically—as, for example, in cases where some of the operating parts get out of order—a manual controller also is provided, said controller being shown in Figs. 1, 5, and 8 and marked $63^a$. Said controller $63^a$ is provided with a shaft $64^a$, a crank $65^a$, and a reversing-lever $66^a$, as shown in Fig. 8. All of these parts may be of any well-known construction, and the construction of the controllers 63 and $63^a$ may be identical, as the only differences between them are in the mechanism by which they are operated.

In addition to the apparatus thus far described I employ a number of switches of common types, which are operated by hand or by the automatic mechanism already described; but in view of the fact that such switches are of well-known types they are not illustrated in detail, but are simply shown in diagrammatic form in Figs. 26 to 30.

The system of wiring of my improved apparatus is shown in Fig. 26. Referring to Fig. 26, A indicates a throw-over switch, the movable arm of which in the construction illustrated is provided with twelve contact-points $a$ $a'$ $a^2$ $a^3$ $a^4$ $a^5$ $a^6$ $a^7$ $a^8$ $a^9$ $a^{10}$ $a^{11}$. This switch may be operated by hand or other power. At one side the arm of said switch is adapted to connect the contact-points $a$ to $a^{11}$, respectively, with contact-points $b$ $b'$ $b^2$ $b^3$ $b^4$ $b^5$ $b^6$ $b^7$ $b^8$ $b^9$ $b^{10}$ $b^{11}$, by which connection is made with the automatic mechanism for operating the motors. At the opposite side the arm of said switch is adapted to make connection between contact-points $a$ to $a^{11}$, respectively, and contact-points $c$ $c'$ $c^2$ $c^3$ $c^4$ $c^5$ $c^6$ $c^7$ $c^8$ $c^9$ $c^{10}$ $c^{11}$, by which connection is made with hand mechanism for controlling the operation of the motors. D indicates an electromagnetic safety-switch, the closing of which is necessary before a current can pass to the motors. $d$ indicates the coils of said switch, and $d'$ the armature thereof. $d^2$ and $d^3$ indicate contact-points adapted to be engaged by the armature $d'$ when the coils $d$ are energized. E indicates the main-line switch, of which $e$ indicates the coil, $e'$ the armature, and $e^2$ $e^3$ contact-points adapted to be engaged by the armature $e'$ when the coil $e$ is energized. F indicates an electromagnetic slow-down switch, of which $f$ indicates the coils, $f'$ the armature, and $f^2$ $f^3$ the contact-points engaged by the armature $f'$ when the coils $f$ are energized. G indicates the stopping-switch, which is automatically operated, as already described. In the diagrammatic views only six of the contact-points $g$ $g'$ $g^2$ $g^3$ $g^4$ $g^5$ $g^6$ $g^7$ are shown as in use; the contact-points $g^6$ and $g^7$ being idle. The contact-points $g$ $g'$ $g^2$ are at one side of the switch G, while the contact-points $g^3$, $g^4$, and $g^5$ are at the other side, the arrangement being such that when the switch G is closed to the right contact-points $g$ $g'$ $g^2$ are in electrical connection with each other, while contact-points $g^3$ $g^4$ $g^5$ are disconnected, and vice versa. H indicates the automatically-operated mechanical slow-down switch already described and shown in Figs. 5 and 12. In the diagrammatic views said switch is shown as having three contact-points $h$ $h'$ $h^2$, respectively. The automatically-operated mechanical devices already described operate to connect contact-point $h'$ with either contact-point $h$ or $h^2$, the contact-point $h$ representing the contacts near one end of the shaft 151, while the contact-point $h^2$ represents that near the other end of said shaft. I and J represent two operating-switches, either of which may be employed to operate the hoist. They are identical in construction and operation, two being provided, so that the machine may be operated from two different points, if desired. As shown in the diagrams, the switch I has two contacts $i$ $i'$, placed between contacts $i^2$ $i^3$ at one side and contacts $i^4$ and $i^5$ at the other. Similarly the switch J has contacts $j$ $j'$ placed between contacts $j^2$ $j^3$ at one side and contacts $j^4$ $j^5$ at the other. K indicates a controlling-switch, by which either of the switches I or J is made operative. The switch K is similar in construction to the switches I and J, being provided with intermediate contact-points $k$ $k'$, placed between contact-points $k^2$ $k^3$ at one side and contact-poins $k^4$ $k^5$ at the other. L indicates the reversing-switch, having solenoid-coils $l$ $l'$. 251 indicates the reversing-lever already described. $l^2$ indicates a contact-point carried by the lever 251, which when the coil $l$ is energized is moved into contact with contact-point $l^3$. $l^4$ indicates a second contact-point, carried at the opposite side of the lever 251 and which when said coil is energized is moved into contact with the contact-point $l^5$. M M' indicate the shunt field-coils of the motors, which are connected in parallel. N N' indicate the armatures. O indicates a field discharge resistance. P indicates a shunt field resistance having a number of contact-points $p, p', p^2, p^3, p^4$, and $p^5$, by which the amount of resistance may be regulated. Q Q' indicate, respectively, the coils of the solenoid-brakes, each solenoid having two coils, one of which is used in connection with the automatic controlling apparatus and the other with the hand control. Either alone is capable of releasing the brake. R indicates an ammeter and S a voltmeter. $t\ t'$ represent, respectively, an overload release circuit-breaker and a no-voltage release circuit-breaker. The connections are as follows: 176 177 indicate the line-wires, said wires being positive and negative, respectively. The wire 176 connects directly with contact-point $a$, the ammeter R and overload release circuit-breaker $t$ being placed in said wire. 178 indicates a wire connecting wire 176 with contact-point $b'$. 179 indicates a wire connecting the wire 176 with the voltmeter S. 180 indicates a wire connecting the wire 176 with one of the brake-coils Q. 181 indicates a wire connecting the opposite end of said brake-coil Q to one of the brake-coils Q'. 182 indicates a wire connecting the opposite end of the latter brake-coil Q' to the contact-point $d^3$. 183 indicates a wire connecting contact-point $d^2$ with one end of the coil $e$ of the main-line switch E. 184 indicates a wire connecting the opposite end of the coil $e$ with reversing-lever 251, which carries contact-points $l^3$ and $l^4$ of the reverse-switch L. 186 indicates a wire connecting contact-point $l^3$ of the reverse-switch L to contact-point $g'$ of the stopping-switch G. 187 indicates a wire connecting contact-point $l^5$ of the switch L to contact-point $g^4$. 188 indicates a wire extending from contact-point $b$ and connecting with contact-point $e^3$ of the main-line switch E by a wire 189 and by a wire 190 with one end of the coil $f$ of slow-down switch F. 191 indicates a wire connecting the opposite end of the coil $f$ with one end of each of the coils $l\ l'$ of reverse-switch L. 192 indicates a wire connecting the opposite end of the coil $l$ to contact-point $g^2$ of stopping-switch G. 193 indicates a wire connecting the opposite end of the coil $l'$ with contact-point $g^3$ of stopping-switch G. 194 indicates a wire connecting contact-point $g$ of switch G with contact-point $i^4$ of operating-switch I. 195 indicates a wire connecting contact-point $i^4$ with contact-point $j^4$ of operating-switch J. 247 indicates a wire connecting contact-points $h$ and $i^5$. 248 indicates a wire which connects contact-points $i^5$ and $j^5$. 249 indicates a wire connecting contact-points $h^2$ and $i^3$, and 250 indicates a wire which connects wire 249 with contact-point $j^3$. 196 indicates a wire connecting contact-point $g^5$ of switch G with a wire 197 which connects said wire 196 with contact-points $i^2$ of switch I and $j^2$ of switch J. 198 indicates a wire connecting contact-point $i$ of operating-switch I to contact-point $k^2$ of controlling-switch K. 199 indicates a wire connecting contact-point $i'$ of operating-switch I to contact-point $k^3$ of switch K. 200 indicates a wire connecting contact-point $j$ of operating-switch J to contact-point $k^4$ of switch K. 201 indicates a wire connecting contact-point $j'$ to contact-point $k^5$. 202 indicates a wire connecting contact-point $k$ to negative line-wire 177. 203 indicates a wire connecting contact-point $h'$ with contact-point $f^2$ of slow-down switch F. 204 indicates a wire connecting contact-point $f^3$ of switch F with a wire 205 by which it is connected to contact-point $a^2$. The wire 205 extends to resistance P, to one end of which it is connected and also to the contact-points $p\ p'\ p^2\ p^3\ p^4\ p^5$. 206 indicates a wire connecting the opposite end of the resistance P to one end of the shunt field-coil M'. 207 indicates a wire connecting the opposite end of the coil M' to contact-point $a'$. As shown, the field discharge resistance O is connected to wires 206 207. 208 indicates a wire connecting wire 206 with one end of the shunt field-coil M. The opposite end of said coil is connected to wire 207. 209 indicates a wire connecting wire 208 with contact-point $h'$ of slow-down switch H. 210 indicates a wire connecting contact-point $b^2$ with one end of the coil $d$ of safety-switch D. 211 indicates a wire connecting the opposite end of the coil $d$ of safety-switch D with the negative line-wire 177. As shown, the negative line-wire 177 passes through the no-voltage-release circuit-breaker $t'$ and is connected to contact-point $a^3$. 213 indicates a wire connecting the wire 177 with the voltmeter S. 214, 215, 216, and 217 indicate wires leading from contact-points $a^4, a^5, a^8$, and $a^9$ to the series motor field-coils. 218 219 220 221 indicate wires leading from contact-points $a^6, a^7, a^{10}$, and $a^{11}$ to the brushes or brush-holders of the motors. 222 indicates a wire leading from contact-point $e^2$ of main-line switch E to the automatic controller 63. 223, 224, 225, 226, 227, 228, 229, 230, and 231 indicate wires leading from contact-points $b^3$ to $b^{11}$, inclusive, to the automatic controller 63. 232 indicates a wire connecting contact-points $c$ and $c'$. 233 indicates a wire connecting contact-points $c^2$ and $c^3$. 234, 235, 237, 238, 239, 240, 241, and 242 indicate wires leading from contact-points $c\ c^3\ c^4\ c^5\ c^6\ c^8\ c^9\ c^{10}$, respectively, to the manual controller $63^a$. 243 indicates a wire leading from contact-point $c^7$ to one end of one of the brake-coils Q'. 244 indicates a wire leading from the other end of said brake-coil Q' to the manual controller. 245 indicates a wire leading from contact-point $c^{11}$ to one end of one of the brake-coils Q. 246 indicates a wire leading from the opposite end of said brake-coil Q to the manual controller.

The operation is as follows: Assuming the skips to be one at the upper end of a trip and the other at the lower end, (one being loading and the other discharging,) the stopping-switch G will be in the position opposite that shown in Fig. 5, the contacts 120 121 122 123 being in engagement with the contacts $g$, $g'$, $g^2$, and $g^6$ and the reversing-switch L will have been operated to reverse the controller 63. The contact $h'$ of the slow-down switch will then be in engagement with the contact $h^2$, both being retracted to the greatest extent. The nut or segment 80 will then be in the position opposite that shown in Figs. 5 and 8—to wit, at the extreme left-hand end of the screw-shaft 76—so that the shaft 64 of the controller 63 will be turned to the minimum-current position. As already explained, either operating-switch I or J may be used to start or stop the mechanism, and it will be assumed at present that the switch I is the one to be employed. This being the case switch K will be turned down to connect contact-points $k$ $k'$ with contact-points $k^2$ $k^3$. When the skips reached the ends of their last preceding trips, the switch I would be in position to connect contact-points $i^2$ and $i^3$ with contact-points $i$ and $i'$, respectively, and it will remain in such position until reversed by the operator. No current, however, will pass through the motors, because the auxiliary circuit will be broken at stopping-switch G and also at reverse-switch L, this being accomplished when the lever 99 was thrown over by the movement of the rod 145 already described. If the mechanism has been operating automatically, the switch A will have been turned down to connect contacts $a$ to $a^{11}$, inclusive, with contacts $b$ to $b^{11}$, inclusive, and by reason of such connections having been made the following circuits will have been established: from wire 176 by wire 178, contact-point $b'$ through the switch A to contact-point $a'$, thence by wire 207 through the shunt field-coils M M' in parallel, thence by wire 206 through a greater or less part of resistance P, thence by wire 205 to contact-point $a^2$, thence through the switch A to contact-point $b^2$, thence by wire 210 to coil $d$ of safety-switch D, and thence by wire 211 to negative line-wire 177. This circuit is shown in light continuous lines in Fig. 27. The coil $d$ will thereby be energized, attracting its armature $d'$ and drawing it into contact with contact-points $d^2$ $d^3$. The closing of the safety-switch D is an essential preliminary to the succeeding operations, as will fully hereinafter appear. As soon as the safety-switch D is closed connection is made from contact $d^2$ to $d^3$ through the armature $d'$. Operating-switch I is then thrown up, connecting contact-points $i$ $i'$ with contact-points $i^4$ $i^5$, respectively. Bearing in mind the fact that the stopping-switch G was turned to the right at the end of the last trip of the skips, thereby connecting contact-points $g$ $g'$ $g^2$, the closing of the switch I, as above stated, establishes the following auxiliary circuit, (see Fig. 28:) from line-wire 176 to contact-point $a$, through switch A to contact-point $b$, thence by wires 188 and 190 to coil $f$ of slow-down switch F, thence by wire 191 through coil $l$ of reverse-switch L, thence by wire 192 to contact-point $g^2$, thence through switch G to contact-point $g$, thence by wire 194 to contact-point $i^4$, thence through switch I to contact-point $i$, thence by wire 198 to contact-point $k^2$, thence through switch K to contact-point $k$, thence by wire 202 to negative line-wire 177, thus energizing coil $f$ of slow-down switch F and coil $l$ of reverse-switch L. The energizing of coil $f$ causes it to attract its armature $f'$, moving it into engagement with contact-points $f^2$ $f^3$, making electrical connection at that point for future use in establishing a circuit through slow-down switch H, as hereinafter described. The function of the safety slow-down switch F is to throw the resistance back into shunt fields, thus reducing the current to normal; also, the energizing of coil $l$ of reverse-switch L causes armature $l^2$ thereof to move into electric contact with contact-point $l^3$. These connections establish the following circuits, (see Fig. 29:) from positive line-wire 176 by wire 180 to brake-coil Q of one of the brakes, thence by wire 181 to brake-coil Q' of the other brake, thence by wire 182 to contact-point $d^3$, through safety-switch D to contact-point $d^2$, thence by wire 183 to coil $e$ of main-line switch E, thence by wire 184 and lever 251 to contact-point $l^2$ of reverse-switch L, thence through contact $l^3$ and wire 186 to contact-point $g'$, thence through stopping-switch G to contact-point $g$, thence through wire 194 to contact-point $i^4$, thence through operating-switch I to contact-point $i$, thence by wire 198 to contact-point $k^2$ through controlling-switch K to contact-point $k$, thence by wire 202 to negative line-wire 177. A current is thus caused to pass through one of the coils of each of the solenoid-brakes, releasing the brakes. The brake-circuit is shown in heavy lines in Fig. 28, the circuit through the slow-down switch F and reverse-coil in lighter lines, and the shunt field-circuit in very light lines. The slow-down mechanism is not operated at this time, since notwithstanding the fact that the slow-down switch F is closed the circuit is still open at the slow-down switch H and is not closed until the skips approach the end of their trip. (It should be borne in mind that at the beginning of the operation now being described—to wit, the starting of the skips on their respective trips—the slow-down switch H is closed to the left, as above explained.) The function of the switch F is to open at the end of the trip as soon as stopping-switch G goes over, thus reducing the current in the shunt fields by throwing the resistance in again to a normal amount even though the switch I be left closed, otherwise the fields would overheat. Upon the passage of the current through coil $e$ of main-line switch E its armature $e'$ moves into contact with contact-points $e^2$ $e^3$, establishing the motor-circuit as follows, (see Fig. 29:) from positive line-wire 176, contact-point $a$, through switch A to contact-point $b$, thence through wires 188 and 189 to contact-point $e^3$, thence through armature $e'$ to contact-point $e^2$, thence by wire 222 to the automatic controller 63 and through the controller-wires 224 to 231, inclusive, and switch A through the armature, thence through wires 223 and switch A to negative line-wire 177. The motor then starts, the speed being gradually increased by the operation of the nut or segment 80 by means of the adjusting-blocks 85 to 90 until it reaches the maximum. The circuits at this time are illustrated in Fig. 29, the shunt field-circuit being indicated by light continuous lines, the circuit through the coil of slow-down switch F being shown in heavy continuous lines, and that through the solenoid-brake coils and through the main-line switch E being shown in the heaviest continuous lines. The motor-circuit is represented by dashes and dots. When the skips approach the end of the trip, the contacts $h'$ and $h$ of the slow-down switch come into engagement, thereby closing the slow-down switch H to the right and establishing the following circuit, (see Fig. 30:) from positive line-wire 176 and wire 178 to contact-point $b'$ through switch A to contact-point $a'$, thence by wire 207 to shunt field-coils M M', thence by wire 206 to wire 209, and thence to contact-point $h'$, thence through switch H to contact-point $h$, thence through wire 247 to contact-point $i^5$, thence through switch I to contact-point $i'$, thence by wire 199 to contact-point $k^3$, thence by switch K to contact-point $k'$, thence by wire 203 to contact-point $f^2$ through armature $f'$ of switch F to contact-point $f^3$ by wire 204 to wire 205, thence to contact-point $a^2$ through switch A to contact-point $b^2$, thence through wire 210, thence through coil $d$ to wire 211, and thence to negative line-wire 177. It will be noted that this circuit cuts out the shunt field resistance, thereby increasing the current passing through the shunt field-coils, the effect of which is to reduce the speed of the motors irrespective of the load. This is an important feature of my invention, since, although the contacts of the slow-down switch are not closed until the controller 63 is nearly turned off and ordinarily the speed thereby reduced, it sometimes happens, owing to the conformation of the skip-track, that the load becomes small or even negative, in which case the motors act as generators, and the slow-down switch is then especially valuable, since it operates to slow down the motors entirely independently of the load. This slow-down-switch circuit is best shown in Fig. 30, wherein it is indicated in very light continuous lines. Upon the establishment of the high shunt field-current the motors run slowly, the speed being also gradually reduced by the rocking of the segment 80 until the end of the trip is reached, when the stopping-lever is thrown over to the left, as illustrated in Fig. 5, by the operation of the rod 145. This operation of the stopping-lever breaks the circuit at stopping-switch G, with the result that all circuits are broken except the shunt field-circuit, which remains established through the resistance P. To move the skips in opposite directions, the operating-switch I is turned down (it being understood that said switch is operated once only for each trip of the two skips) when the same circuits above described are established in the same order, except that the reversing-coil $l'$ of reverse-switch L is cut into circuit instead of the coil $l$, and consequently the circuit by which the main-line switch E is energized passes through armature $l^4$ and contact $l^5$ instead of through armature $l^2$ and contact $l^3$, also the slow-down switch H when operated is closed to the left instead of to the right. If the switch J be used as the operating-switch instead of switch I, the operation is exactly the same as that described. The current through the shunt fields may be increased or reduced and the speed of the motors regulated by closing a greater or less number of the switches of the shunt field resistance P without affecting the action of the slow-down mechanism.

In describing the various circuits I have confined my description to the specific arrangement of the wires as shown on the diagrams; but of course it will be understood that I have done so in order to make clear the different connections made and that my invention is not restricted to making the connections in the specific manner illustrated in the diagrams, it being essential only that the circuits described be provided for.

By my improved system of construction it will be seen that the only operation which the attendant has to perform is to shift the operating-switch I or J, as the case may be, from one of its positions to the other, all the other operations being entirely automatic. It should be noted, further, that until the shunt field-circuit was properly established and the operating-controller properly reversed the motor-circuit was not established, and consequently the motors could not start. Furthermore, if the shunt field-circuit should be broken accidentally the safety-switch D, which is closed by said circuit, would immediately open, breaking the motor-circuit at main-line switch E and also the brake-circuit at switch D, setting the brakes and stopping the motors. When the skips reach either end of a trip and the stopping-switch is shifted as described, the breaking of the different circuits stops the motors, sets the brakes, and throws the resistance P back into the shunt field-circuit, thereby preventing the high field-current from heating the shunt field-coils when the hoisting mechanism is not in operation. Until the operating-switch I is reversed the motors cannot run again in the same direction, because of the reversal of the stopping-switch G. Consequently there is no danger of breakage on that account.

In case it should be desired to operate by hand the switch A is thrown up instead of down and the manual controller $63^a$ is used instead of the automatic controller 63. Upon the throwing up of the switch A and closing the main-line circuit-breakers $t\ t'$ the shunt field-circuit will be established as follows: from positive line-wire 176 to contact-point $a$ through switch A to contact-point $c$ by wire 232 to contact-point $c'$, thence through switch A to contact-point $a'$, thence by wire 207 to shunt field-coils M M', thence by wire 206, resistance P, wire 205 to contact-point $a^2$, thence through switch A to contact-point $c^2$, thence by wire 233 to contact-point $c^3$, and thence through switch A to contact-point $a^3$, which is connected to negative line-wire 177. The manual controller $63^a$ is connected to line-wires 176 177 by wires 234 235, respectively, through contact-points $c\ c^3\ a\ a^3$ and switch A. The manual controller $63^a$ is connected to the motors by wires 237, 238, 239, 240, 241, 242, connected, respectively, to contact-points $c^4$, $c^5$, $c^6$, $c^8$, $c^9$, and $c^{10}$, the connection being made through the switch A and contact-points $a^4$, $a^5$, $a^6$, $a^8$, $a^9$, and $a^{10}$. The controller is further connected with the armatures of the motors by wires 243, 244, 245, and 246, the connections being as follows: by wire 244 to one end of one of the brake-coils Q', thence to wire 243 to contact-point $c^7$, thence through switch A to contact-point $a^7$, thence through wire 219 to motor N', thence by wire 218 to contact-point $a^6$, thence through switch A to contact-point $c^6$, thence by wire 239 to the manual controller, also by wire 246 to one end of one of the brake-coils Q, through said coil and wire 245 to contact-point $c^{11}$, thence through switch A, contact-point $a^{11}$, thence by wire 221 to the motor N, thence by wire 220 to contact-point $a^{10}$, thence through switch A to contact-point $c^{10}$, thence by wire 242 to the manual controller. The mechanism is controlled by the manual controller $63^a$ in the ordinary way and is reversed by means of the reversing-lever $66^a$. Of course when the manual controller is in use, the switch A being thrown up, the automatic mechanism is entirely cut out.

The function of the field-discharge resistance O is to take the field-discharge whenever the shunt field-circuits are open, thereby preventing rupture of the insulation.

By the construction described it will be seen that I provide for operating the hoisting mechanism either by hand or automatically, so that if for any reason the automatic mechanism should get out of order the hoisting mechanism may nevertheless be operated. When, however, the automatic mechanism is employed, the only manual act required is to throw the operating-switch I or J, as the case may be, in one direction or the other at the end of each trip made by the skip.

I have described my invention in detail; but it should be understood that various modifications may be made, as I do not restrict myself to the specific details of the apparatus described, except in so far as they are specifically claimed.

I have shown the stopping-switch as being provided with four contacts at each side; but it is not necessary that any specific number be employed, as one or more may be used, as may be preferred, all that is necessary being that the stopping-switch shall be so constructed as to secure a satisfactory contact when moved in either direction. Similarly the details of construction of various other parts of the apparatus may be varied as may be necessary without departing from my invention.

The apparatus ordinarily would be used to operate a double skip; but of course a single skip could be used if desired.

That which I claim as my invention, and desire to secure by Letters Patent, is—

1. A hoisting mechanism comprising the following elements: a hoisting-motor, controlling mechanism therefor, automatic mechanism for operating said controlling mechanism, manual mechanism for operating said controlling mechanism, and means for bringing into use either the manual or the automatic operating mechanism, as and for the purpose set forth.

2. A hoisting mechanism comprising the following elements: a hoisting-motor, controlling mechanism therefor, automatic mechanism for operating said controlling mechanism, manual mechanism for operating said controlling mechanism, and a switch for bringing into use either the manual or the automatic operating mechanism, as and for the purpose set forth.

3. A hoisting mechanism including the following elements: a driven mechanism, an automatic controller, and a manual controller for controlling the operation of said driven mechanism, and a switch for making connection with either said automatic controller or said manual controller, whereby either of said controllers may be employed to control the operation of said driven mechanism, as and for the purpose set forth.

4. A hoisting mechanism including a hoisting-motor, an automatic and a manual controller therefor, and a switch common to both controllers whereby either of said controllers may be thrown into operation at will, as and for the purpose set forth.

5. The combination of electrically-operated hoisting mechanism, controlling mechanism, means for automatically operating said controlling mechanism to gradually stop the car when it approaches either end of its trip, and means for automatically changing the circuit connections when the car reaches either end of its trip so that said hoisting mechanism may be employed to raise and lower the car, substantially as described.

6. The combination of electrically-operated hoisting mechanism, controlling mechanism, and means for automatically operating said controlling mechanism to place the circuit connections of the hoisting mechanism in condition to be reversed when the car reaches either end of its trip and means for reversing the hoisting-motor circuit so that said hoisting mechanism may be employed to raise and lower the car, substantially as described.

7. The combination of electrically-operated hoisting mechanism, a plurality of electric motors for operating said hoisting mechanism, controlling devices, said motors being connected to the same controlling devices, whereby they may be simultaneously and similarly operated, and separate brakes for said motors, said controlling devices being adapted to operate said brakes, substantially as described.

8. The combination of hoisting mechanism, electric-motor mechanism for operating said hoisting mechanism, means for reversing said motor mechanism to provide for reversing the operation of said hoisting mechanism, and means for automatically operating said reversing mechanism when the car reaches either end of its trip, substantially as described.

9. The combination of hoisting mechanism, electric-motor mechanism for operating said hoisting mechanism, means for reversing said motor mechanism to provide for reversing the operation of said hoisting mechanism, means for automatically operating said reversing mechanism when the car reaches either end of its trip, and means for breaking the circuit through said motor mechanism when the car reaches either end of its trip, substantially as described.

10. The combination of hoisting mechanism, electric-motor mechanism for operating said hoisting mechanism, means for automatically reversing said motor mechanism to reverse the operation of said hoisting mechanism when the car reaches the end of a trip, and automatic means for slowing down the motor mechanism when the car approaches either end of its trip, substantially as described.

11. The combination of hoisting mechanism, electric-motor mechanism for operating said hoisting mechanism, means for automatically reversing said motor mechanism to reverse the operation of said hoisting mechanism when the car reaches the end of a trip, electrically-operated brake mechanism for said motor mechanism, and automatic means for operating said brake mechanism to set the brakes when the car reaches either end of its trip, substantially as described.

12. The combination of hoisting mechanism, electric-motor mechanism for operating said hoisting mechanism, a controller for controlling the operation of said motor mechanism, an operating-switch as I, a switch in the motor-circuit, means for automatically opening said motor-circuit when the car reaches either end of its trip, and means for automatically closing said motor-circuit switch when the operating-switch is actuated, substantially as described.

13. The combination of hoisting mechanism, electric-motor mechanism for operating said hoisting mechanism, a controller for controlling the operation of said motor mechanism, an operating-switch, a switch in the motor-circuit, and stopping-switch mechanism for automatically opening said motor-circuit switch when the car reaches either end of its trip, substantially as described.

14. The combination of hoisting mechanism, electric-motor mechanism for operating said hoisting mechanism, a controller for controlling the operation of said motor mechanism, an operating-switch, a switch in the motor-circuit for automatically opening said motor-circuit when the car reaches either end of its trip, automatic means for closing said motor-circuit switch by means of said operating-switch, and means for slowing down the motor mechanism when the car approaches either end of its trip, substantially as described.

15. The combination of hoisting mechanism, electric-motor mechanism for operating said hoisting mechanism, an operating-switch as I, a switch in the motor-circuit, means operated by said operating-switch for closing said motor-circuit switch, a stopping-switch between said operating-switch and the source of the electric current, whereby said stopping-switch controls the operation of said operating-switch, and automatic means for operating said stopping-switch when the car reaches either end of its trip, to break the circuit through said operating-switch, substantially as described.

16. The combination of hoisting mechanism, an electric motor for operating said hoisting mechanism, a controller therefor, a safety-switch in the shunt field-circuit, a motor-circuit switch, means operated by the closing of the shunt field-circuit for closing the motor-circuit switch, and an operating-switch for closing the motor-circuit, substantially as described.

17. The combination of hoisting mechanism, an electric motor for operating said hoisting mechanism, a controller therefor, a safety-switch in the shunt field-circuit, a motor-circuit switch, means operated by the closing of the shunt field-circuit for closing the motor-circuit switch, an operating-switch for closing the motor-circuit, and means for automatically breaking the motor-circuit when the car reaches either end of its trip, substantially as described.

18. The combination of hoisting mechanism, an electric motor for operating said hoisting mechanism, a controller therefor, a safety-switch in the shunt field-circuit, a motor-circuit switch, means operated by the closing of the shunt field-circuit for closing the motor-circuit switch, an operating-switch for closing the motor-circuit, and a stopping-switch for breaking the motor-circuit when the car reaches either end of its trip, substantially as described.

19. The combination of hoisting mechanism, an electric motor for operating said hoisting mechanism, a safety-switch in the shunt field-circuit, said safety-switch being adapted to be closed by the closing of the shunt field-circuit, an operating-switch, and means operated by the closing of said operating-switch and said safety-switch for operating the motor, substantially as described.

20. The combination of hoisting mechanism, an electric motor for operating said hoisting mechanism, a safety-switch in the shunt field-circuit, said switch being closed by the closing of the shunt field-circuit, a motor-circuit switch, said switch being normally open, means operated by the closing of said safety-switch for closing said motor-circuit switch, an operating-switch, a stopping-switch between said operating-switch and said safety-switch, and a reversing-switch between said stopping-switch and said safety-switch, substantially as described.

21. The combination of hoisting mechanism, an electric motor for operating said hoisting mechanism, a safety-switch in the shunt field-circuit, a mechanically-operated slow-down switch H, an electrically-operated slow-down switch F controlling the operation of said first-mentioned slow-down switch, and means for closing said switch H when the car approaches either end of its trip, substantially as described.

22. The combination of hoisting mechanism, an electric motor for operating said hoisting mechanism, a safety-switch D in the shunt field-circuit, a motor-circuit switch E, a slow-down switch F, a stopping-switch G, a slow-down switch H, and a controlling-switch I, connected and operated substantially as described and for the purposes set forth.

23. The combination of hoisting mechanism, an electric motor for operating said hoisting mechanism, manual and automatic controlling mechanism, a switch A arranged to make connection either with the automatic or the manual controlling mechanism, a safety-switch D, a motor-circuit switch E, a slow-down switch F, a stopping-switch G, a slow-down switch H, and an operating-switch I, connected and operated substantially as described and for the purposes set forth.

24. The combination of hoisting mechanism, an electric motor for operating said hoisting mechanism, manual and automatic controlling mechanism therefor, a switch arranged to make connection either with the automatic or manual controlling mechanism, said automatic controlling mechanism being arranged to vary the speed of the car and to stop the car at the end of its trip, and an operating-switch, operating in connection with said automatic controlling mechanism to start the car, substantially as described.

25. The combination of hoisting mechanism, electric-motor mechanism for operating said hoisting mechanism, means for starting said hoisting mechanism, automatic means for slowing down the motor mechanism when the car approaches either end of its trip, and means for adjusting the operation of said slow-down means, substantially as described.

26. The combination of hoisting mechanism, electric-motor mechanism for operating said hoisting mechanism, a controller controlling the operation of said motor mechanism, means for operating said controller to slow down the motor mechanism when the car approaches either end of its trip, and means for automatically reversing the action of the motor mechanism, substantially as described.

27. The combination of hoisting mechanism, electric-motor mechanism for operating said hoisting mechanism, a controller controlling the operation of said motor mechanism, means for operating said controller to slow down the motor mechanism when the car approaches either end of its trip, and means for adjusting the operation of said controller-operating mechanism, substantially as described.

28. The combination of hoisting mechanism, electric-motor mechanism for operating said hoisting mechanism, a series-parallel controller for controlling the operation of said motor mechanism, means for automatically operating said controller to vary the speed of the car, and means for automatically reversing the action of the motor mechanism, substantially as described.

29. The combination of hoisting mechanism, electric-motor mechanism for operating said hoisting mechanism, a series-parallel controller for controlling the operation of said motor mechanism, means for operating said controller to slow down the motor mechanism when the car approaches either end of its trip, and means for automatically reversing the action of the motor mechanism, substantially as described.

30. The combination of hoisting mechanism, electric-motor mechanism for operating said hoisting mechanism, a controller, means for automatically reversing the action of the motor mechanism, and automatic means for operating said controller to vary the speed of the car, substantially as described.

31. The combination of hoisting mechanism, a plurality of electric motors for operating said hoisting mechanism, a controller controlling the operation of said motors, a slow-down switch for establishing a high shunt field-circuit, and means for automatically closing said switch when the car approaches either end of its trip, substantially as described.

32. The combination of hoisting mechanism, an electric motor for operating said hoisting mechanism, a controller controlling the operation of said motor, a slow-down switch for establishing a high shunt field-current, means for closing said switch when the car approaches either end of its trip, and an automatic safety-switch controlling the operation of said slow-down switch, substantially as described.

33. The combination of hoisting mechanism, an electric motor for operating said hoisting mechanism, a controller controlling the operation of said motor, a slow-down switch for establishing a high shunt field-current, means for closing said switch when the car approaches either end of its trip, and means for adjusting the operation of said slow-down switch, substantially as described.

34. The combination of hoisting mechanism, an electric motor for operating said hoisting mechanism, a controller controlling the operation of said motor, a mechanically-operated slow-down switch, an electrically-operated switch controlling the operation of said slow-down switch, means for establishing a high shunt field-current when said slow-down switch is closed, and means for closing said slow-down switch when the car approaches either end of its trip, substantially as described.

35. The combination of hoisting mechanism, an electric motor for operating said hoisting mechanism, a controller for controlling the operation of said motor, a shunt field resistance, a slow-down switch arranged to cut out said resistance and establish a high shunt field-current, and means for automatically operating said slow-down switch to cut out said resistance when the car approaches one end of its trip, substantially as described.

36. The combination of hoisting mechanism, an electric motor for operating said hoisting mechanism, a controller for controlling the operation of said motor, a shunt field resistance, a slow-down switch arranged to cut out said resistance and establish a high shunt field-current, means for automatically operating said slow-down switch to cut out said resistance when the car approaches one end of its trip, and means for automatically cutting said resistance into circuit with the shunt field-coils when the motor is stopped, substantially as described.

37. The combination of hoisting mechanism, electric motor for operating said hoisting mechanism, a controller for controlling the operation of said motor, a shunt field resistance, a slow-down switch arranged to cut out said shunt field resistance and establish a high shunt field-current, means for automatically operating said slow-down switch to cut out said resistance when the car approaches one end of its trip, means for automatically cutting said resistance into circuit with the shunt field-coils when the motor is stopped, and means for varying the operation of said slow-down switch, substantially as described.

38. A hoisting apparatus, consisting of hoisting mechanism, a motor for operating said hoisting mechanism, a controller for controlling the operation of said motor, means for automatically operating said controller to reduce the speed of the motor as the car approaches either end of its trip, means for stopping the motor when the car reaches either end of its trip, means for automatically reversing the action of the motor mechanism, and means for establishing a high shunt field-current when the car approaches either end of its trip, substantially as described.

39. A hoisting apparatus, consisting of hoisting mechanism, a motor for operating said hoisting mechanism, a controller for controlling the operation of said motor, means for automatically operating said controller to reduce the speed of the motor as the car approaches either end of its trip, means for stopping the motor when the car reaches either end of its trip, a shunt field resistance, and means for cutting out said resistance and establishing a high shunt field-current when the car approaches either end of its trip, substantially as described.

40. A hoisting apparatus, consisting of hoisting mechanism, a motor for operating said hoisting mechanism, a controller for controlling the operation of said motor, means for automatically operating said controller to reduce the speed of the motor as the car approaches either end of its trip, means for stopping the motor when the car reaches either end of its trip, a shunt field resistance, means for cutting out said resistance and establishing a high shunt field-current when the car approaches either end of its trip, and means for automatically cutting said resistance into circuit with the shunt field-coils when the motor is stopped, substantially as described.

41. A hoisting apparatus consisting of hoisting mechanism, an electric motor for operating said hoisting mechanism, an automatically-actuated controller for controlling the operation of said motor, automatic means for slowing down the motor as the car approaches one end of its trip, automatic means for stopping the motor when the car reaches the end of its trip, and a single operating-switch mounted independently of the car for starting the motor in either direction, substantially as described.

42. A hoisting apparatus consisting of hoisting mechanism, an electric motor for operating said hoisting mechanism, a controller controlling the operation of said motor, automatic means for slowing down the motor as the car approaches one end of its trip, automatic means for stopping the motor when the car reaches the end of its trip, automatic means for reversing the controller when the car reaches the end of its trip, and a single operating-switch for starting the motor in either direction, substantially as described.

43. The combination of hoisting mechanism, an electric motor for operating said hoisting mechanism, manual and automatic controlling mechanism, a switch A arranged to make connection either with the automatic or the manual controlling mechanism, a safety-switch D, a motor-circuit switch E, a slow-down switch F, a stopping-switch G, a slow-down switch H, an operating-switch I, and a safety reverse-switch L, connected and operated substantially as described and for the purposes set forth.

44. A hoisting mechanism including the following elements: a car, means for operating the same, controlling mechanism for controlling said operating means, automatic mechanism for operating said controlling mechanism, a manual device for operating said controlling mechanism, and means mounted independently of the car for bringing into use either the manual or the automatic operating mechanism, as and for the purpose set forth.

45. A hoisting mechanism including the following elements: a car, means for operating the same, controlling mechanism for controlling said operating mechanism, automatic mechanism for operating said controlling mechanism, manual mechanism for operating said controlling mechanism, and a switch mounted independently of the car for bringing into use either the manual or the automatic operating mechanism, as and for the purpose set forth.

46. The combination of hoisting mechanism, electric-motor mechanism for operating said hoisting mechanism, means for reversing said motor mechanism to provide for reversing the operation of said hoisting mechanism, and means operated by the hoisting mechanism for automatically operating said reversing mechanism when the car reaches either end of its trip, substantially as described.

47. The combination of hoisting mechanism, electric-motor mechanism for operating said hoisting mechanism, means for reversing said motor mechanism to provide for reversing the operation of said hoisting mechanism, and means for automatically operating said reversing mechanism when the car reaches one end of its trip, substantially as described.

48. The combination of hoisting mechanism, electric-motor mechanism for operating said hoisting mechanism, a controller for controlling the operation of said motor mechanism, an operating-switch mounted independently of the car, a switch in the motor-circuit, and stopping-switch mechanism for automatically opening said motor-circuit switch when the car reaches either end of its trip, substantially as described.

49. The combination of hoisting mechanism, electric-motor mechanism for operating said hoisting mechanism, a controller therefor, a plurality of operating-switches mounted independently of the car, and means for cutting either of said operating-switches into circuit, whereby the hoisting mechanism may be operated from either of a plurality of points, substantially as described.

50. The combination of hoisting mechanism, electric-motor mechanism for operating said hoisting mechanism, a controller for controlling the operation of said motor mechanism, an operating-switch mounted independently of the car, a switch in the motor-circuit for automatically opening said motor-circuit when the car reaches either end of its trip, automatic means for closing said motor-circuit switch by means of said operating-switch for starting the hoisting mechanism to move the car in either direction, and means for slowing down the motor mechanism when the car approaches either end of its trip, substantially as described.

51. A hoisting mechanism including the following elements: a car, a hoisting mechanism therefor, an electric motor for operating the hoisting mechanism, manual and automatic controlling mechanisms for the motor, a switch arranged to make connection with either the automatic or the manual controlling mechanism, said automatic controlling mechanism being arranged to vary the speed of the car at the end of its trip, and an operating-switch mounted independently of the car and operating in connection with the automatic controlling mechanism to start the car, as and for the purpose set forth.

52. A hoisting apparatus, consisting of hoisting mechanism, an electric motor for operating said hoisting mechanism, a controller controlling the operation of said motor, automatic means for slowing down the motor as the car approaches one end of its trip, means for stopping the motor when the car reaches the end of its trip, automatic means for reversing the controller when the car reaches the end of its trip, and an operating-switch mounted independently of the car for starting the motor, substantially as described.

53. The combination of electrically-operated hoisting mechanism, controlling mechanism, switch mechanism for starting the car in either direction, and means for automatically breaking the circuit through said switch mechanism and establishing reverse circuit connections adapted to be closed by movement of said switch mechanism to reverse the movement of the car, when the car reaches one end of its trip, substantially as described.

54. The combination of electrically-operated hoisting mechanism, controlling mechanism, a single switch for starting the car in either direction, and means for automatically breaking the circuit through said switch and establishing reverse circuit connections adapted to be closed by movement of said switch to reverse the movement of the car, when the car reaches either end of its trip, substantially as described.

EUGENE B. CLARK, 2D.

Witnesses:
JOHN L. JACKSON,
HELEN M. COLLIN.